US012554387B2

United States Patent
Agrawal et al.

(10) Patent No.: US 12,554,387 B2
(45) Date of Patent: Feb. 17, 2026

(54) DETECTING DEAD SNAPPING REGIONS AND ELIMINATING SNAPPING GUIDES BASED THEREON

(71) Applicant: Adobe Inc., San Jose, CA (US)

(72) Inventors: Vivek Agrawal, Noida (IN); Shikhar Tayal, Aligarh (IN)

(73) Assignee: Adobe Inc., San Jose, CA (US)

( * ) Notice: Subject to any disclaimer, the term of this patent is extended or adjusted under 35 U.S.C. 154(b) by 34 days.

(21) Appl. No.: 18/544,909

(22) Filed: Dec. 19, 2023

(65) Prior Publication Data

US 2025/0199670 A1    Jun. 19, 2025

(51) Int. Cl.
*G06F 3/04845* (2022.01)
*G06F 3/0481* (2022.01)
*G06F 40/106* (2020.01)
*G06F 40/117* (2020.01)
*G06F 40/143* (2020.01)

(52) U.S. Cl.
CPC ........ *G06F 3/04845* (2013.01); *G06F 3/0481* (2013.01); *G06F 40/106* (2020.01); *G06F 40/117* (2020.01); *G06F 40/143* (2020.01)

(58) Field of Classification Search
CPC .. G06F 3/04845; G06F 3/0481; G06F 40/106; G06F 40/117; G06F 40/143
See application file for complete search history.

(56) References Cited

U.S. PATENT DOCUMENTS

| 10,650,576 B1* | 5/2020 | Jain | G06F 40/166 |
| 2012/0131483 A1* | 5/2012 | Archer | G06F 3/0486 |
| | | | 715/766 |
| 2013/0050256 A1* | 2/2013 | Hirota | G06F 3/0481 |
| | | | 345/629 |
| 2015/0067497 A1* | 3/2015 | Cieplinski | G06F 3/04883 |
| | | | 715/702 |
| 2018/0032489 A1* | 2/2018 | Zhou | G06F 16/9577 |
| 2020/0311974 A1* | 10/2020 | Pareek | G06T 7/174 |

* cited by examiner

*Primary Examiner* — Keith D Bloomquist
(74) *Attorney, Agent, or Firm* — Keller Preece PLLC

(57) ABSTRACT

The present disclosure relates to systems, methods, and non-transitory computer-readable media that provides a subset of the set of snapping guides that excludes snapping guides. In particular, in some embodiments, the disclosed systems identify a set of objects within a viewport and further determine one or more at least partially obscured objects within the viewport. Furthermore, in some embodiments the disclosed systems receive a user interaction to modify the object and further determine a set of snapping guides to aid in modifying the object based on the user interaction. Moreover, in some embodiments the disclosed systems provide a subset of the set of snapping guides and excludes snapping guides based on the one or more at least partially obscured objects.

20 Claims, 16 Drawing Sheets

DETECTING DEAD SNAPPING REGIONS AND ELIMINATING SNAPPING GUIDES BASED THEREON

BACKGROUND

Recent years have seen significant advancements in hardware and software platforms for creating and modifying digital illustration documents. For example, many platforms offer software applications that provide tools to modify objects within digital illustration documents. For instance, many platforms provide snapping guides as tools within digital illustration software applications to help guide the modification of objects. Despite advancements in creating and modifying digital illustration documents, conventional platforms suffer from a variety of issues in relation to efficiency, accuracy, and operational flexibility of displaying snapping guides.

SUMMARY

One or more embodiments described herein provide benefits and/or solve one or more of problems in the art with systems, methods, and non-transitory computer-readable media that determines at least partially obscured objects and excludes snapping guides based on the at least partially obscured objects. For example, in one or more embodiments, the disclosed systems utilize an innovative method for the automatic detection and suppression of dead snapping-regions in the user-editing space of digital illustration documents. Further, in some embodiments the disclosed systems address the issue of visual clutter caused by ghost guides (e.g., snapping guides that snap to regions not visible within a viewport) and enhance the user interface by providing a clearer understanding of the target objects and alignment. For instance, by intelligently suppressing snapping to partially as well as fully dormant-snapping-targets and eliminating ghost guides within these regions, the disclosed systems significantly minimize visual noise and declutters the user-editing space. Accordingly, the disclosed systems eliminate the distraction of irrelevant guides and fosters a more streamlined and efficient workflow.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
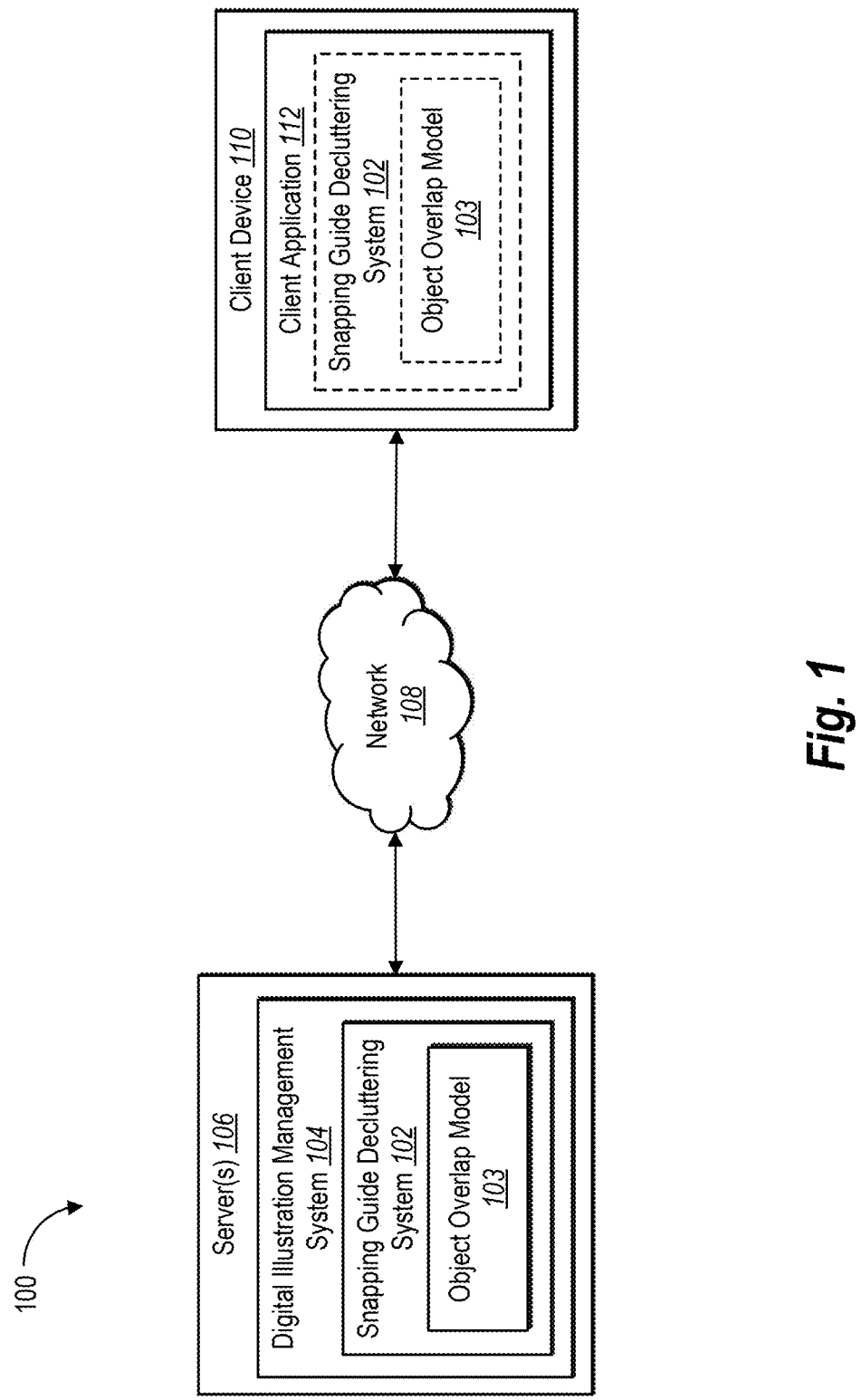
FIG. 1 illustrates an example environment in which a snapping guide decluttering system operates in accordance with one or more embodiments.

One or more embodiments described herein include a snapping guide decluttering system that determines at least partially obscured objects and provides a set of snapping guides to a user but excludes some of the snapping guides that snap to partially or wholly obscured objects. For example, in some embodiments the snapping guide decluttering system excludes a subset of the set of snapping guides (e.g., conventional systems show all snapping guides resulting in UI clutter) based on determining at least partially obscured objects. For instance, the snapping guide decluttering system identifies objects within the viewport and determines one or more at least partially obscured objects. Furthermore, upon receiving a user interaction to modify an object, the snapping guide decluttering system determines a set of snapping guides and provides a subset of the set of snapping guides that excludes snapping guides based on the at least partially obscured objects. To illustrate, the snapping guide decluttering system uses a z-order map and a novel algorithm (e.g., to detect overlaps and segregate obscured objects from obscuring objects) to determine at least partially obscured objects.

In one or more embodiments, a digital illustration document contains multiple obscuring entities (e.g., objects) which causes a region within a viewport to become dead snapping regions (e.g., a snapping guide snapping to a region that is obscured). For example, the multiple obscuring entities which result in dead-snapping regions includes docked user-interface panels, floating user-interface panels (e.g., non-document object model objects, hereinafter referred to as "non-DOM objects") and obscuring document object model objects (hereinafter referred to as "DOM objects").

For instance, the user interface panels (e.g., the non-DOM objects) have a higher z-order compared to DOM objects and thus, such user interface panels obscure the underlying DOM objects. Moreover, in some embodiments another significant source of dead-snapping-regions include the DOM objects themselves. For instance, in a digital illustration document, designers place objects in an overlapping fashion following a certain z-ordering. In some such instances, DOM objects partially or fully obscure other objects, resulting in ghost guides emanating from dead snapping regions.

Furthermore, in one or more embodiments, the objects partially or completely obscured by dead snapping regions (e.g., obscured by DOM or non-DOM objects) include partially or fully dormant snapping targets. Moreover, in some embodiments the dead snapping regions due to DOM objects differ from those due to non-DOM objects. For example, the dead snapping regions due to non-DOM objects contain universal regions applicable to all snapping targets (e.g., because non-DOM objects contain the highest z-order relative to the rest of the objects) while the dead-snapping-regions due to DOM objects contain regions applicable to objects of a lower z-order.

Moreover, in one or more embodiments, the snapping guide decluttering system identifies positions of DOM objects within the viewport and the opacity of an obscuring object. Further, in some embodiments the snapping guide decluttering system identifies a list of detected non-DOM objects and a list of detected DOM objects within the viewport and further refers to the list when evaluating whether to display a snapping guide.

Further, in some such embodiments the snapping guide decluttering system runs an algorithm (e.g., a combination of a sweep line algorithm and an interval tree) to determine object overlaps and makes use of z-order information of objects to segregate obscuring objects from obscured objects in a detected overlap. Moreover, in some embodiments the snapping guide decluttering system utilizes the algorithm to detect dead-snapping-regions due to DOM objects, identify all the dormant-snapping targets (partially and fully) clipped by the viewport or obscured by other DOM objects, and marks the dormant regions of partially obscured objects. Furthermore, while doing so, the snapping guide decluttering system accommodates the impact of non-DOM regions by considering them as obscuring objects of the highest z-order. Furthermore, in some embodiments the snapping guide decluttering system caches the obtained data and updates the obtained data in response to z-order changes, user-interface panel reposition and/or a viewport update (i.e., zoom-pan).

Moreover, in some embodiments the snapping guide decluttering system utilizes the cached data during snapping evaluations. For instance, when a designer of the digital design application moves the cursor to find appropriate point of object creation or performs edits (translate/scale/rotate) to an existing object, the snapping guide decluttering system evaluates all the objects inside or on the boundary of viewport to find snapping with the designer's cursor position or object's bounds or angular position. In some such embodiments, during this evaluation, the snapping guide decluttering system ensures that fully dormant snapping targets are skipped, thus, completely suppressing snapping with them.

Further, in some embodiments for partially dormant targets, the snapping guide decluttering system performs the evaluation for each of the points or segments of the target objects, which are considered key entities for snapping evaluations. In particular, the snapping guide decluttering system checks whether the points or segments of the target objects lie within the partially obscured region of the objects. If so, the snapping guide decluttering system skips such entities from the snapping evaluation. In doing so, the snapping guide decluttering system suppresses snapping with partially dormant targets.

As mentioned above, many conventional systems suffer from a number of issues in relation to computational inefficiency, inaccuracy, and operational flexibility. For example, some existing digital illustration systems inefficiently cause a user interface to display ghost guides (e.g., guides that snap to a region not visible within the viewport) and dangling guides (e.g., guides that snap to a region in the viewport but obstructed from view by another object) that result from snapping to dead-snapping regions (e.g., partially, or wholly obscured object regions). For instance, existing digital illustration systems displaying ghost guides and dangling guides result in a cluttered user interface and hinder designers in determining an intended alignment for an object during modification.

Furthermore, in some instances, existing digital illustration systems suffer from excessive interactions within a graphical user interface during the process of a designer navigating through incoherent snapping guides and dangling snapping guides. Specifically, in some instances in existing digital illustration systems, designers are required to attempt multiple iterations of an object modification to correctly align/transform/scale the object. Accordingly, existing digital illustration systems suffer from computational inefficiencies such as excessive interactions and wasted time.

Relatedly, existing digital illustration systems suffer from computational inaccuracy. As just mentioned, due to the cluttered user interface and the presence of incoherent snapping guides, existing digital illustration systems suffer from incorrectly modified objects. Often, a designer of existing digital illustration systems fails to correctly align/transform/scale an object within the digital illustration document.

Relatedly, existing digital illustration systems suffer from operational inflexibility. Indeed, for reasons similar to those described in relation to the inefficiency and inaccuracy of some prior systems, many prior systems are also rigidly limited to showing snapping guides for dead snapping regions that are incoherent and/or unintelligible. In particular, existing digital illustration systems fail to intelligently provide snapping guides within a user interface. Thus, many of the inefficiency and inaccuracy concerns discussed above exacerbates the operational flexibility of existing digital illustration systems.

As suggested, one or more embodiments of the snapping guide decluttering system provides several advantages over conventional digital illustration systems. For example, in one or more embodiments, the snapping guide decluttering system improves efficiency over prior systems. For example, as mentioned, conventional digital illustration systems suffer from inefficiently causing a user interface to display ghost guides and dangling guides that result from snapping to dead snapping regions. In contrast, the snapping guide decluttering system determines one or more at least partially obscured objects within the viewport of the digital illustration application and provides, in response to a user interaction, a subset of the set of snapping guides that excludes snapping guides based on the one or more at least partially obscured objects. In doing so, the snapping guide decluttering system eliminates inefficiently displaying ghost guides and dangling guides.

Furthermore, as mentioned, conventional digital illustration systems suffer from inefficiencies of excessive user interactions. In one or more embodiments, the snapping guide decluttering system determines a set of snapping guides to aid in modifying an object and provides a subset of the snapping guides that excludes snapping guides based on the one or more at least partially obscured objects. In doing so, the snapping guide decluttering system eliminates incoherent snapping and reduces the iterations required to correctly modify an object. Thus, the snapping guide decluttering system reduces excessive interactions and reduces the clutter of the user interface.

Similarly, the snapping guide decluttering system also improves upon computational accuracy. As just mentioned, the snapping guide decluttering system determines a set of snapping guides to aid in modifying an object and provides a subset of the snapping guides that excludes snapping guides based on the one or more at least partially obscured objects. In doing so, the snapping guide decluttering system accurately displays coherent snapping guides which results in designers more accurately orienting/transforming objects within the digital illustration application.

Relatedly, the snapping guide decluttering system improves upon operational flexibility. For example, rather than being rigidly limited to showing snapping guides for dead snapping regions, the snapping guide decluttering system intelligently determines wholly obscured objects, regions of partially obscured objects, and a transparency level of obscuring objects to provide a subset of the set of snapping guides that excludes snapping guides based on the one or more at least partially obscured objects. In doing so, the snapping guide decluttering system more flexibly provides intelligent snapping guides within the digital illustration application.

Additional details regarding the snapping guide decluttering system will now be provided with reference to the figures. For example, FIG. 1 illustrates a schematic diagram of an exemplary system environment 100 in which a snapping guide decluttering system operates 102. As illustrated in FIG. 1, the system environment 100 includes a server(s) 106, a digital illustration management system 104, an object overlap model 103, a network 108, a client device 110, and a client application 112.

Although the system environment 100 of FIG. 1 is depicted as having a particular number of components, the system environment 100 is capable of having a different number of additional or alternative components (e.g., a different number of servers, client devices, or other components in communication with the snapping guide decluttering system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 11). Moreover, the server(s) 106 and the client device 110 include one or more of a variety of computing devices (including one or more computing devices as discussed in greater detail in relation to FIG. 11).

As mentioned above, the system environment 100 includes the server(s) 106. In one or more embodiments, the server(s) 106 processes input to modify one or more objects within a digital illustration application from a user of the client application 112 to snapping guides associated with the modification. In one or more embodiments, the server(s) 106 comprises a data server. In some implementations, the server(s) 106 comprises a communication server or a web-hosting server.

In one or more embodiments, the client device 110 includes a computing device that is able to provide for display the digital illustration application, entities within a digital illustration document such as objects and user interface panels and snapping guides on a graphical user interface of the client application 112. For example, the client device 110 includes smartphones, tablets, desktop computers, laptop computers, head-mounted-display devices, or other electronic devices. The client device 110 includes one or more applications (e.g., a digital illustration application) for modifying objects in accordance with the digital illustration management system 104. For example, in one or more embodiments, the client application 112 works in tandem with the snapping guide decluttering system 102 to determine a subset of snapping guides to provide to the client application 112. In particular, the client application 112 includes a software application installed on the client device 110. Additionally, or alternatively, the client application 112 of the client device 110 includes a software application hosted on the server(s) 106 which may be accessed by the client device 110 through another application, such as a web browser.

To provide an example implementation, in some embodiments, the snapping guide decluttering system 102 on the server(s) 106 supports the snapping guide decluttering system 102 on the client device 110. For instance, in some cases, the digital illustration management system 104 on the server(s) 106 gathers data for the snapping guide decluttering system 102. In response, the snapping guide decluttering system 102, via the server(s) 106, provides the information to the client device 110. In other words, the client device 110 obtains (e.g., downloads) the snapping guide decluttering system 102 and the object overlap model 103 from the server(s) 106. Once downloaded, the snapping guide decluttering system 102 on the client device 110 provides one or more snapping guides based on at least partially obscured objects.

In alternative implementations, the snapping guide decluttering system 102 includes a web hosting application that allows the client device 110 to interact with content and services hosted on the server(s) 106. To illustrate, in one or more implementations, the client device 110 accesses a software application supported by the server(s) 106. In response, the snapping guide decluttering system 102 on the server(s) 106, utilizes the object overlap model 103. The server(s) 106 provides the snapping guides to the client device 110 for display.

To illustrate, in some cases, the snapping guide decluttering system 102 on the client device 110 receives an object modification input. The client device 110 transmits the object modification input to the server(s) 106. In response, the snapping guide decluttering system 102 on the server(s) 106 determines a relevant subset of snapping guides to cause the client device 110 to display via the graphical user interface of the client application 112.

Indeed, in some embodiments, the snapping guide decluttering system 102 is implemented in whole, or in part, by the individual elements of the system environment 100. For instance, although FIG. 1 illustrates the snapping guide decluttering system 102 implemented or hosted on the server(s) 106, different components of the snapping guide decluttering system 102 are able to be implemented by a variety of devices within the system environment 100. For example, one or more (or all) components of the snapping guide decluttering system 102 are implemented by a different computing device (e.g., the client device 110) or a separate server from the server(s) 106. Indeed, as shown in FIG. 1, the client device 110 includes the snapping guide decluttering system 102. Example components of the snapping guide decluttering system 102 will be described below with regard to FIG. 9.

Figure 2:
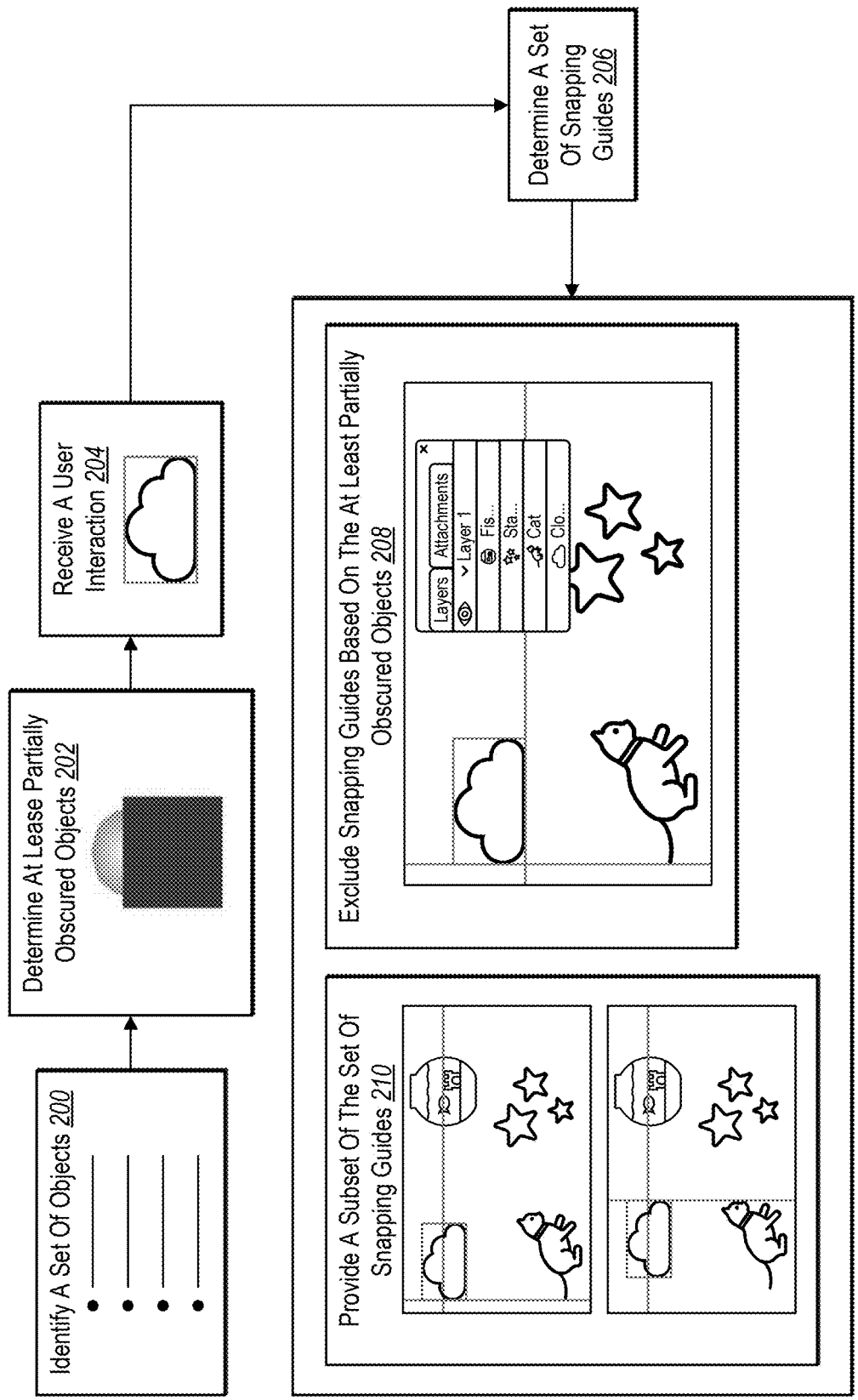
FIG. 2 illustrates an overview of the snapping guide decluttering system determining a set of snapping guides and excluding a subset of snapping guides based on determining at least partially obscured objects in accordance with one or more embodiments.

As mentioned above, in certain embodiments, the snapping guide decluttering system 102 determines a subset of snapping guides to provide and excludes snapping guides based on at least partially obscured objects. FIG. 2 illustrates an overview of the snapping guide decluttering system 102 identifying a set of objects and determining a set of snapping guides in response to a user interaction in accordance with one or more embodiments.

For example, FIG. 2 shows the snapping guide decluttering system 102 performs an act 200 of identifying a set of objects. In particular, the act 200 of identifying the set of objects includes identifying objects within a viewport of a digital illustration application. In one or more embodiments, a digital illustration application includes an application for creating and editing illustrations and artwork. For instance, the digital illustration application includes tools such as brushes, vectors, drawing tools, and painting tools. Furthermore, in some instances digital illustration applications also include various text input fields. Accordingly, the digital illustration application includes a mix of object, image, and text fields, and user interface tools to modify elements within a digital illustration document associated with the digital illustration application.

In one or more embodiments, a digital illustration document includes a file with various design/illustration properties. In particular, the digital illustration document includes elements that fit within a dimension of the digital illustration document. For instance, the digital illustration document includes digital invitations, digital cards, digital fliers, digital posters, and various other digital files that include design elements such as text, images, and other artistic elements. Accordingly, the digital illustration application allows for a designer to edit and modify the digital illustration document.

As mentioned above, the snapping guide decluttering system 102 identifies objects. For example, an object includes a collection of pixels that depicts a user-interface element, shape, person, place, text, or thing. To illustrate, in some embodiments, an object includes a shape, a person, an item, a natural object (e.g., a tree or rock formation) or a structure depicted in a digital illustration document. For instance, an object includes text that depicts a word or a series of words. In some instances, an object refers to a plurality of elements that, collectively, is distinguished from other elements depicted in a digital illustration document. For example, in some instances, an object includes a collection of buildings that make up a skyline. In some instances, an object more broadly includes a (portion of a) foreground or other element(s) depicted in a digital illustration document as distinguished from a background. Furthermore, the object includes either vectorized or rasterized objects.

In one or more embodiments, a rasterized image includes a grid of pixels. In particular, the rasterized object includes a fixed resolution as determined by a number of pixels within the digital illustration document. Further, in one or more embodiments, a vectorized object includes various mathematical equations to define lines, shapes, and curves. In particular, vectorized objects includes resolution-independent images within the digital illustration document. For instance, scaling up or down the vectorized object does not result in a loss of quality. Additional details regarding DOM objects and non-DOM objects are given below in the description of FIG. 3.

As shown in FIG. 2, the snapping guide decluttering system 102 performs an act 202 of determining at least partially obscured objects. In one or more embodiments, an obscured object includes an object that is partially or wholly hidden from view within the viewport of a graphical user interface. For example, an obscured object includes objects completely outside of the viewport, objects partially outside of the viewport, and objects in the viewport but with another object covering it. For instance, an obscured object includes other digital design elements or user interface components (e.g., DOM or non-DOM objects) obstructing the view of an object. Additional details regarding how the snapping guide decluttering system 102 determines at least partially obscured objects is given below in the description of FIGS. 3-6.

Moreover, as shown in FIG. 2, the snapping guide decluttering system 102 receives a user interaction 204. In particular, the snapping guide decluttering system 102 receives the user interaction 204 from a user of a client device via the digital illustration application. Specifically, in some embodiments the user interaction 204 includes a translation action, a scaling action, and/or a rotation action.

Furthermore, as shown in FIG. 2, based on the user interaction 204, the snapping guide decluttering system 102 performs an act 206 of determining a set of snapping guides. For example, a snapping guide includes a visual or functional element within a digital illustration application to help align and position objects accurately and precisely. For instance, the snapping guide decluttering system 102 provides a snapping guide for a designer to maintain consistency, accuracy, and visual order in the digital illustration document. Further, the snapping guide includes vertical, horizontal, or angular lines and other indicators (e.g., spacing indications). Moreover, in some instances the snapping guide decluttering system 102 utilizes snapping guides to allow for an object to automatically attract or snap to other objects within the digital illustration document.

Additionally, as shown in FIG. 2, from the act 206 of determining the set of snapping guides, the snapping guide decluttering system 102 performs an act 210 and an act 208. Specifically, as shown, the act 210 includes the snapping guide decluttering system 102 providing a subset of the set of snapping guides to the viewport of the client device as the user interaction 204 is being performed. Furthermore, as shown, the act 208 includes the snapping guide decluttering system 102 excluding snapping guides from the set of snapping guides based on the at least partially obscured objects. Further details of excluding the snapping guides are provided below in the description of FIGS. 4-5B.

Figure 3:
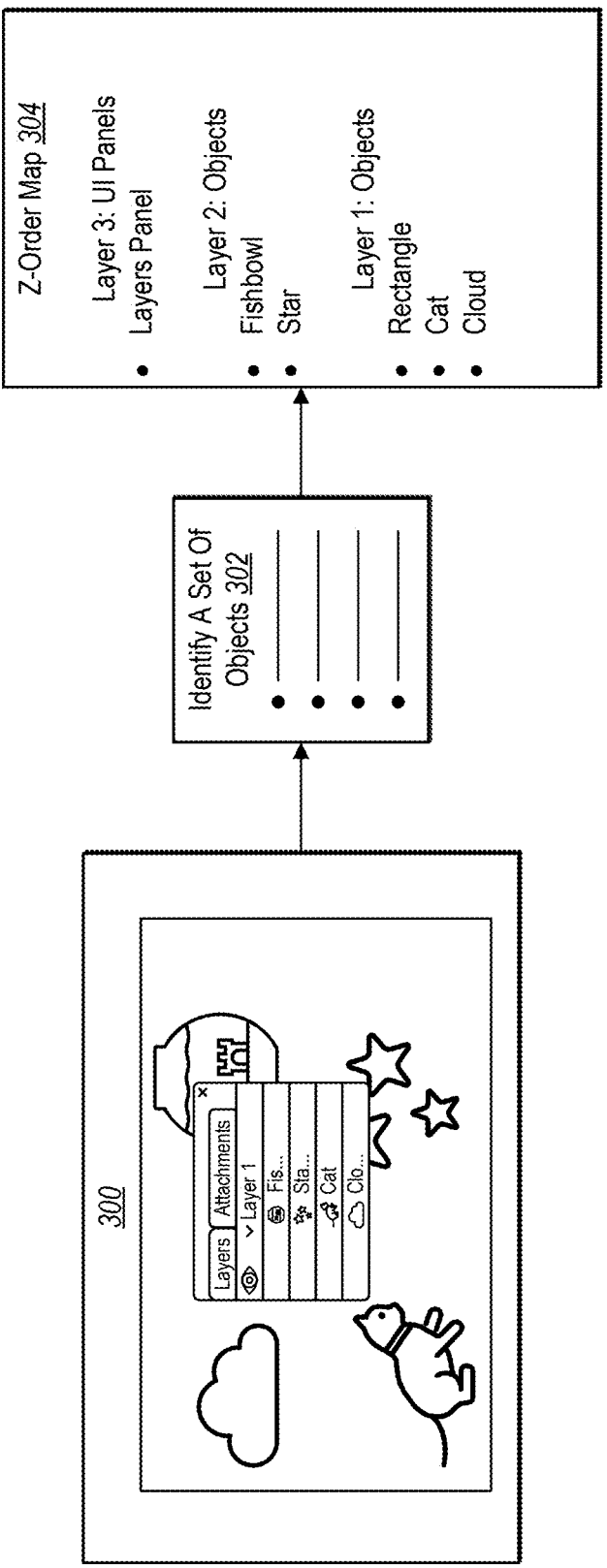
FIG. 3 illustrates a diagram of the snapping guide decluttering system generating a z-order map of objects within a viewport in accordance with one or more embodiments.

As mentioned above, in certain embodiments, the snapping guide decluttering system 102 generates a z-order map of the objects within the viewport. FIG. 3 illustrates the snapping guide decluttering system 102 identifying objects within the viewport and generating a z-order map in accordance with one or more embodiments. As shown in FIG. 3, a graphical user interface of a client device depicts what a user sees in the digital illustration application. For example, FIG. 3, shows a portion of the digital illustration application via the graphical user interface; the portion shown comprises a viewport 300.

In one or more embodiments, the viewport 300 includes a visible area of a digital illustration application displayed on a graphical user interface of a client device running the digital illustration application. For example, when a user of a client device first opens the digital illustration application, the graphical user interface displays an initial viewport (e.g., the visible portion without any scrolling or zooming) that fits within the dimensions of the graphical user interface (e.g., when the canvas is in full-screen mode). Further, in some instances, the viewport 300 includes a sub-portion of the graphical user interface because of the digital illustration application control panels (e.g., user interface panels when the canvas is not in full-screen mode). Thus, in some such embodiments, the viewport 300 includes the visible canvas (e.g., the portion of the digital illustration application where digital illustration is performed). Moreover, in some embodiments a viewport of the digital illustration application changes in response to zooming in or out, scrolling, and adjusting the graphical user interface to display a portion not previously visible within the graphical user interface. Furthermore, in some embodiments, designers within a digital illustration application switch between different views (e.g., updates the viewport) for editing different portions of a digital illustration document.

As shown in FIG. 3, from the viewport 300 of the digital illustration application, the snapping guide decluttering system 102 performs an act 302 of identifying a set of objects. For example, identifying the set of objects includes detecting document object model objects (e.g., DOM objects). In one or more embodiments, the DOM object includes a representation of structure, content, and properties within a digital illustration application. For instance, a user of the digital illustration application interacts with and manipulates DOM objects. Further, in some embodiments the DOM objects include HTML or XML format. Accordingly, the DOM objects refer to a specific element or node within the digital illustration application. To illustrate, DOM objects are part of a DOM tree structure, where each node of the DOM tree structure corresponds to a specific element in the digital illustration application.

Moreover, in some embodiments, identifying the set of objects includes detecting non-document object model objects (e.g., non-DOM objects). In one or more embodiments, a non-DOM object includes an object or entity of the digital illustration application not part of a DOM tree structure. For instance, the non-DOM object exists independent of the digital illustration document and is not directly accessible by a designer through the DOM tree structure. To illustrate, the non-DOM object includes a user interface panel such as a layers panel, a properties panel, and an appearance panel. Accordingly, a user of the digital illustration application interacts with the user interface panels (non-DOM objects) to modify various properties of the digital illustration document.

For instance, the snapping guide decluttering system 102 performs the act 302 of identifying the set of objects by utilizing various parsing models to obtain a DOM tree structure and the non-DOM objects. To illustrate, the snapping guide decluttering system 102 utilizes parsing models to extract data from a digital illustration application (e.g., in some instances a web-based application) to identify the set of objects for a specific viewport. Moreover, in some instances, the snapping guide decluttering system 102 first identifies the non-DOM objects, extracts a DOM tree structure, and then inserts the non-DOM objects in the DOM tree structure (as DOM objects) with a z-order higher than all the other DOM objects. In other words, in some instances the snapping guide decluttering system 102 treats the non-DOM objects as DOM objects of the highest z-order.

As shown in FIG. 3, from performing the act 302 of identifying the set of objects, the snapping guide decluttering system 102 generates a z-order map 304. For example, the z-order map 304 includes a visual or textual representation that records the stacking order (e.g., z-order) of objects (e.g., DOM and non-DOM) within the digital illustration document. Further, in some embodiments the z-order map 304 includes different elements layered on top of one another.

For instance, the z-order map includes a layer name, a z-order value (e.g., a smaller z-order value indicates an element closer to the background while a higher z-order value indicates an element closer to the foreground), opacity information for each layer, and various grouping or nesting properties of elements for each layer. Moreover, in a three-dimensional space, a z-axis includes a depth dimension for the positioning of objects. For instance, in some embodiments, in three orthogonal axes coordinate system, the z-axis represents a line perpendicular to the x-axis and the y-axis (e.g., depth or height).

In one or more embodiments, the snapping guide decluttering system 102 generates the z-order map by first generating the DOM tree structure to determine an order in which elements (e.g., DOM objects) appear in the tree (e.g., later defined elements in the tree structure indicates a higher z-order). In some embodiments, the snapping guide decluttering system 102 obtains the properties of the digital illustration document (e.g., via obtaining cascading style sheets) to obtain a z-index where a higher z-index indicates the object is closer to the foreground. Moreover, in some embodiments, the snapping guide decluttering system 102 obtains layering and stacking properties of the digital illustration document to determine the specific z-order of documents as dictated by a layer the object appears on.

As shown in FIG. 3, the z-order map 304 includes three layers. As shown, the third layer (e.g., the layer closest to the foreground) includes obscuring non-DOM objects. Specifically, FIG. 3 shows a user-interface panel in the current viewport that includes a layers panel (e.g., in some embodiments the viewport could also show a properties panel and/or an appearance panel). Moreover, FIG. 3 shows the second layer includes objects (e.g., DOM objects) that include fishbowl and star. Further, FIG. 3 also shows the first layer includes a rectangle object (e.g., DOM object) that could potentially be overlapped by the DOM or non-DOM objects because the rectangle has the lowest z-order (e.g., the rectangle is closest to the background layer of the digital illustration document) and also a cat and cloud DOM object.

Although FIG. 3 discusses the snapping guide decluttering system 102 generating the z-order map 304, in one or more embodiments the snapping guide decluttering system 102 identifies the z-order map 304 from indications applied to the user-interface panels. Specifically, the snapping guide decluttering system 102 receives indications from a designer of the digital illustration application that indicates the layers of various objects in the digital illustration document. Accordingly, in some such embodiments the snapping guide decluttering system 102 references the user-interface panel indications to determine the z-order map 304.

Figure 4:
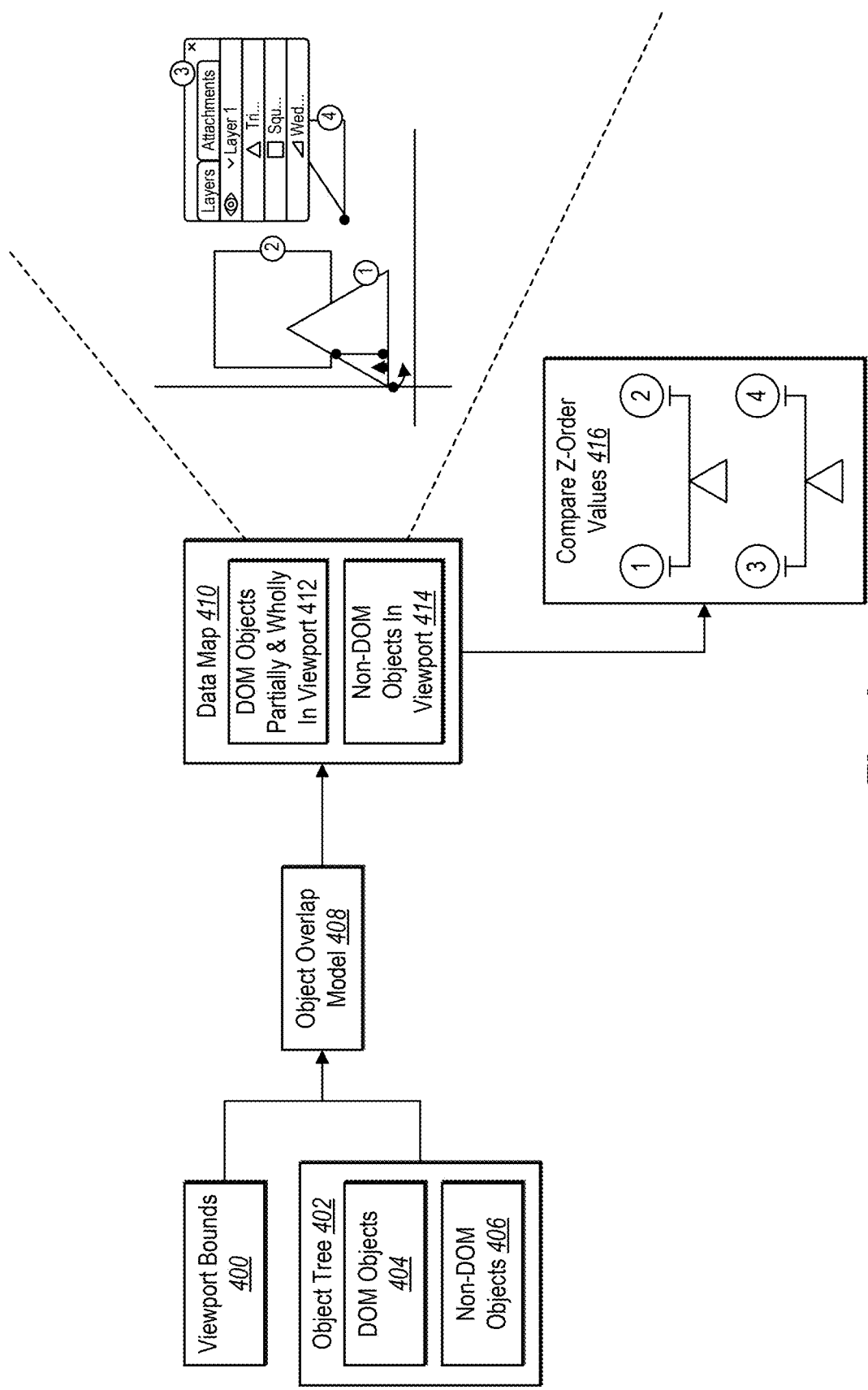
FIG. 4 illustrates a diagram of the snapping guide decluttering system generating a data map to determine at least partially obscured objects in accordance with one or more embodiments.

As mentioned above, the snapping guide decluttering system 102 determines at least partially obscured objects to determine which snapping guides to provide and which snapping guides to exclude. FIG. 4 shows the snapping guide decluttering system 102 generating a data map (e.g., a target dormancy data map) to determine at least partially obscured objects in accordance with one or more embodiments. For example, FIG. 4 illustrates the snapping guide decluttering system 102 processing as input, viewport bounds 400 and an object tree 402.

As discussed above, the viewport bounds 400 include the visible area of a canvas (e.g., full screen mode or partial screen mode) of the digital illustration application displayed on the graphical user interface of the client device. To reiterate, the snapping guide decluttering system 102 receives as input the viewport bounds 400 to determine objects out of view (e.g., not within the viewport bounds 400) and/or objects partially out of view (e.g., partially within the viewport bounds 400. Accordingly, in some embodiments the viewport bounds 400 change in response to scrolling, zooming, or some other action.

As shown in FIG. 4, the snapping guide decluttering system 102 also processes as input the object tree 402 that includes DOM objects 404 and non-DOM objects 406. In one or more embodiments, the snapping guide decluttering system 102 generates the object tree 402. For example, the object tree 402 includes a hierarchical structure that represents the organization of elements and nodes within a digital illustration document (e.g., HTML or XML). For instance, the object tree 402 includes the structure and content of a digital illustration document with a document node at the top of the tree (e.g., the root) and branches that include elements such as the head, body, and objects in between. Moreover, in some embodiments the object tree 402 includes a parent-child relationship where child nodes share the same parent node.

In some embodiments, the non-DOM objects 414 reside partially out of the viewport and in the viewport, however the snapping guide decluttering system 102 receives clipped bounds of the non-DOM objects 414 (to only include bounds within the viewport). In some embodiments, the snapping guide decluttering system 102 receives the entire bounds of the non-DOM objects 414 (even if it resides outside of the viewport) and determines the bounds considered within the viewport when running an object overlap model 408 (e.g., a core algorithm).

As shown in FIG. 4, the snapping guide decluttering system 102 utilizes the object overlap model 408 to process the viewport bounds 400 and the object tree 402. In some embodiments the object overlap model 408 includes initially determining a visibility state of the non-DOM objects 406 (e.g., user interface panels). Further, in some such embodiments the snapping guide decluttering system 102 utilizes the object overlap model to iterate through the visible non-DOM objects (e.g., visible within the graphical user interface) and identify positions of the non-DOM objects 406 relative to the viewport bounds 400. Moreover, in some such embodiments the snapping guide decluttering system 102 utilizes the object overlap model 408 to also identify the transparency of the non-DOM objects 406 and an overlap region with the viewport bounds 400 (e.g., the visible part of the canvas).

Accordingly, the snapping guide decluttering system 102 utilizes the object overlap model 408 to determine that a dead-snapping region includes a region with positions of non-DOM objects in the viewport bounds 400 and a transparency value of the non-DOM objects within the viewport bounds 400 that indicates opaqueness. Furthermore, in some such embodiments the snapping guide decluttering system 102 utilizes the object overlap model 408 to determine a precise dead-region area (e.g., an obscured region) by identifying the overlap region of the non-DOM objects 406 and the viewport bounds 400 (e.g., the canvas).

Moreover, in one or more embodiments the snapping guide decluttering system 102 utilizes the object overlap model 408 to keep tabs on the non-DOM objects 406. For instance, the snapping guide decluttering system 102 utilizes the object overlap model 408 to record the initial visibility, dimensions, and/or positions of the non-DOM objects 406. Furthermore, in some such instances, the object overlap model 408 receives indications of changes to visibility, dimensions, and/or positions of the non-DOM objects 406. In some such instances the snapping guide decluttering system 102 updates the initial parameters of the non-DOM objects to reflect the changes.

Furthermore, in some embodiments the snapping guide decluttering system 102 utilizes the object overlap model 408 to determine dead snapping regions amongst the DOM objects 404. For example, the snapping guide decluttering system 102 utilizes the object overlap model 408 to identify z-order values of the DOM objects 404 and compares the z-order values to identify objects of lower z-order values. For instance, the snapping guide decluttering system 102 utilizes the object overlap model 408 to identify overlapping DOM objects and the z-order of the overlapping DOM objects to determine the dead-snapping regions amongst the DOM objects 404. Accordingly, the snapping guide decluttering system 102 utilizes the object overlap model 408 to record the position, visibility, and/or dimensions of the DOM objects 404.

In one or more embodiments, the snapping guide decluttering system 102 utilizes the object overlap model 408 to reduce computational complexity involved with creating a comprehensive list of objects (e.g., the DOM objects 404 and the non-DOM objects 406). For example, the snapping guide decluttering system 102 utilizes the object overlap model 408 to detect object overlaps and segregate obscured objects from obscuring objects for each overlapping object (e.g., the object overlap model 408 runs with quasilinear complexity).

Furthermore, as mentioned above, the snapping guide decluttering system 102 utilizes the object overlap model 408 to identify obscured regions by identifying regions partially or fully obscured by the non-DOM objects 406 and regions partially or fully obscured by the DOM objects 404. Moreover, in some embodiments, the snapping guide decluttering system 102 utilizes the object overlap model 408 to generate a data map 410 (e.g., the data map stores data determined/identified by the object overlap model 408) for further utilization during determining a set of snapping guides to provide to a designer during modification of an object.

As shown in FIG. 4, the snapping guide decluttering system 102 utilizes the object overlap model 408 to generate the data map 410 which includes DOM objects 412 partially and wholly in the viewport, and non-DOM objects 414 in the viewport. As further shown in FIG. 4, the snapping guide decluttering system 102 references the data map 410 to determine overlapping regions of objects (e.g., at least partially obscured). Moreover, as shown in FIG. 4, the snapping guide decluttering system 102 performs an act 416 of comparing the z-order values of overlapping objects to determine obscuring objects versus obscured objects.

In one or more embodiments, an obscured object includes a wholly obscured object. For example, a wholly obscured object includes an object completely outside of the viewport or an object within the viewport (e.g., partially or wholly) and wholly obscured by another object. For instance, a wholly obscured object includes a DOM object wholly covered by a non-DOM object or wholly covered by another DOM object. In other words, a wholly obscured object has a z-order value less than another object in the digital illustration document.

In one or more embodiments, the obscured object also includes a partially obscured object. For example, a partially obscured object includes an object within the viewport partially covered by another object or an object partially outside of the viewport. For instance, a partially obscured object includes an object within the viewport where a part of the object is covered by a non-DOM object (e.g., a user-interface panel) or partially covered by a DOM object. In other words, a partial region of the object is obscured from being visible within the viewport. Further, in some instances, the partially obscured object includes a region of an object outside of the viewport and a region of the object within the viewport.

In one or more embodiments, the data map 410 includes a layer or object positioning and ordering map. Further, in some instances the data map 410 includes a visual or textual representation of the precise position, order, and characteristics of objects within the digital illustration application. In some instances, the data map 410 applies to a specific viewport. Moreover, in some instances, the data map 410 includes information such as an object identifier, position coordinates, dimensions of an object, order and hierarchy, appearance attributes, alignment and spacing of objects.

Figure 5A:
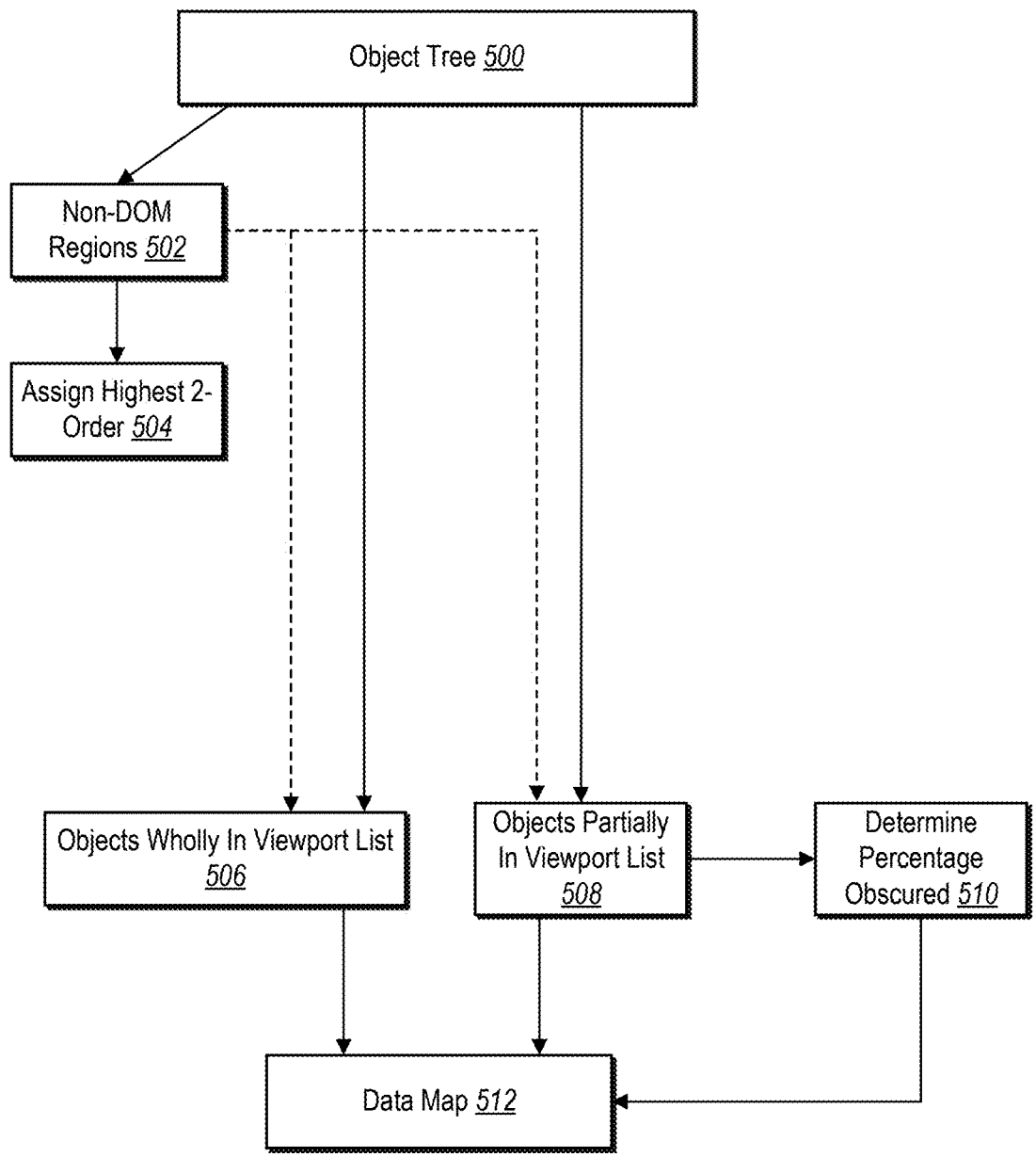
FIGS. 5A-5B illustrates a diagram of the snapping guide decluttering system utilizing the object overlap model to determine obscured objects and obscuring objects.
Figure 5B:
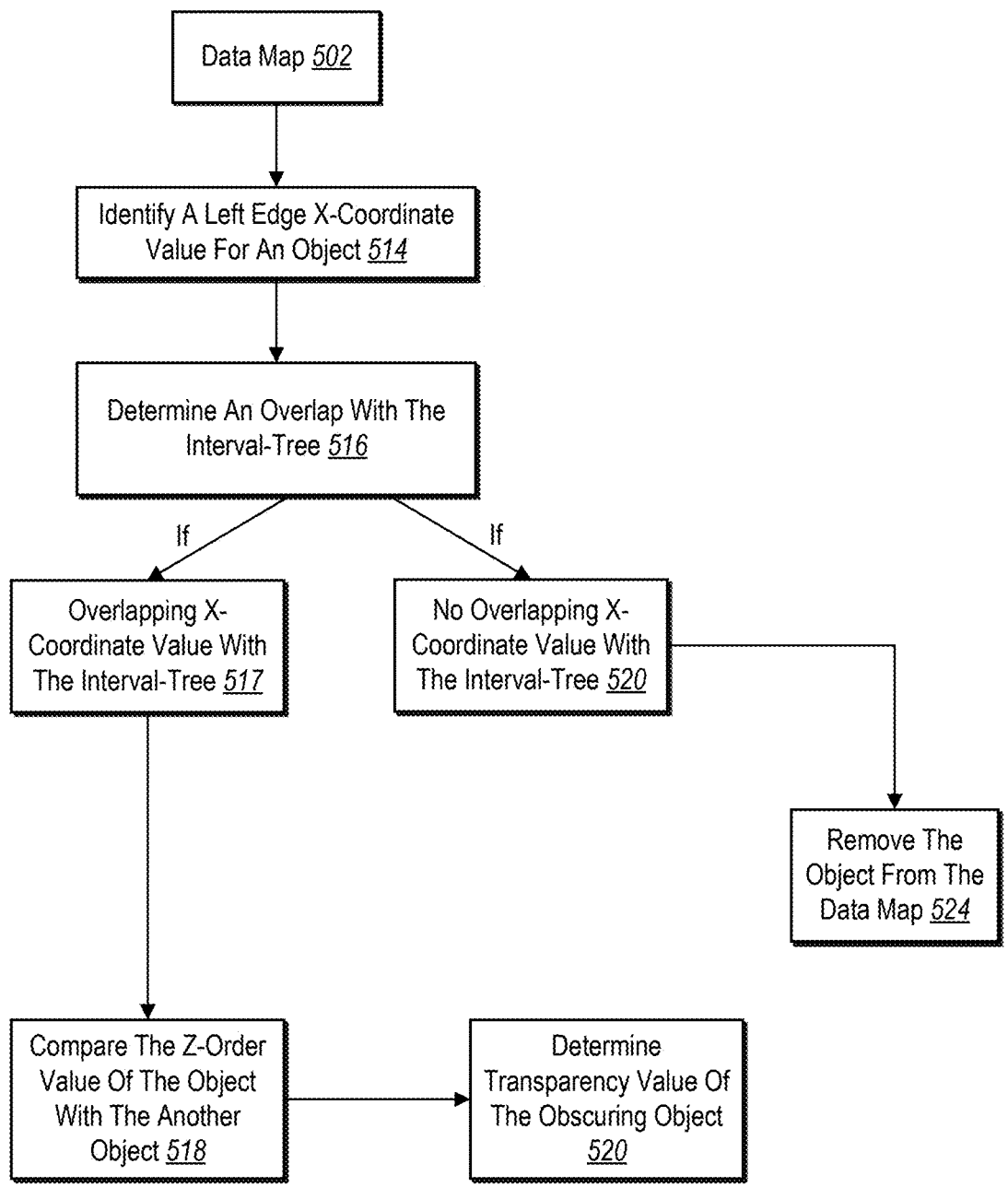

FIG. 4 discussed the snapping guide decluttering system 102 utilizing the object overlap model 408 to generate the data map 410 and to determine at least partially obscured objects. FIGS. 5A-5B provides additional details of the snapping guide decluttering system 102 utilizing an object overlap model to generate a data map and iterate through the data map to determine obscuring objects versus obscured objects.

For example, FIG. 5A shows an object tree 500, which was discussed above in FIG. 4. As shown in FIG. 5A, the snapping guide decluttering system 102 iterates through the object tree 500 to generate two lists. For instance, the snapping guide decluttering system 102 generates an object wholly in viewport list 506, and an object partially in viewport list 508. Accordingly, the snapping guide decluttering system 102 segregates the objects at least partially within the viewport from the objects wholly within the viewport to include within one of the two lists. Furthermore, the snapping guide decluttering system 102 excludes objects completely outside of the viewport (e.g., as those objects are not important for performing a snapping evaluation).

Moreover, as shown in FIG. 5A, from the object tree 500, the snapping guide decluttering system 102 performs an act of identifying non-DOM regions 502 (e.g., regions where a user-interface panel is present). Further, as shown, for the non-DOM regions 502, the snapping guide decluttering system 102 further performs an act 504 of assigning a highest z-order. Additionally, in some embodiments for each of the non-DOM regions 502, the snapping guide decluttering system 102 inserts a non-DOM region into the objects wholly in viewport list 506 if the non-DOM region is wholly within the viewport bounds. Whereas, in some embodiments, the snapping guide decluttering system 102 inserts a non-DOM region into the objects partially in viewport list 508 for objects partially within the viewport bounds.

Furthermore, as shown in FIG. 5A, the snapping guide decluttering system 102 also determines an impact of clipped objects (e.g., determines a dormancy status of an object such as how much of an object is within the viewport). For instance, the snapping guide decluttering system 102 determines how much of an object is within the viewport. As shown, the snapping guide decluttering system 102 performs an act 510 of determining a percentage obscured for objects in the objects partially in viewport list 508.

In some such embodiments, the snapping guide decluttering system 102 calculates the percentage obscured by starting at the left object boundary for an object in the objects partially in viewport list 508. For instance, the snapping guide decluttering system 102 determines a percentage of an obscured width starting from the left edge by using a clipped width of the object against its total width. To illustrate, the snapping guide decluttering system 102 calculates the percentage of an obscured width by taking the difference between the left viewport bounds and the left bounds of an object, dividing the difference by the total bounds width of the object, and multiplying the result by one hundred (e.g., to determine the percentage).

In one or more embodiments, the snapping guide decluttering system 102 further determines the percentage obscured by utilizing a left object boundary, a right object boundary, a top object boundary, a bottom object boundary, a center horizontal boundary, and a center vertical boundary. For instance, the snapping guide decluttering system 102 calculates the percentage by utilizing a bound of the object with a corresponding viewport bounds.

As shown in FIG. 5A, the snapping guide decluttering system 102 generates a data map 512 from the objects wholly in viewport list 506, the objects partially in viewport list 508 and the percentage obscured for the objects partially in viewport list 508.

FIG. 5B illustrates the snapping guide decluttering system 102 determining an impact of objects on other objects by utilizing the object overlap model (e.g., determining which objects are obscuring and which objects are obscured by using a sweep line algorithm in combination with an interval tree). In one or more embodiments, the snapping guide decluttering system 102 combines the objects wholly in viewport list 506 and the objects partially in viewport list 508 to generate a combined list. In some such embodiments, the snapping guide decluttering system 102 utilizes the combined list to determine an impact of objects on other objects. For instance, the snapping guide decluttering system 102 generates an x-point list that includes x-values, object-references (e.g., object identifiers), and object edge identifier (e.g., left edge or right edge).

Further, in some embodiments the snapping guide decluttering system 102 arranges the x-point list. For instance, in some such embodiments, the snapping guide decluttering system 102 sorts the x-point list in ascending order based on the x-value. Moreover, in addition to the x-point list, in some embodiments the snapping guide decluttering system 102 generates an interval tree. In some such embodiments the interval tree includes intervals along a y-axis for the objects.

In one or more embodiments, the snapping guide decluttering system 102 references the x-point list to obtain for each x-point, an object identifier and the current object bounds corresponding to the object identifier. For instance, the snapping guide decluttering system 102 performs an act 514 of identifying a left edge x-coordinate value for an object (e.g., by referencing the object edge identifier in the x-point list). Moreover, in some such instances the snapping guide decluttering system 102 performs an act 516 of determining an overlap of the bottom bounds and/or the top bounds of the object (identified from the left edge x-coordinate value) with the interval tree (e.g., a y-value intersection of y1 and y2 of another object with the y1 and y2 current object).

As shown, in some instances the snapping guide decluttering system 102 performs an act 517 of determining an overlapping x-coordinate value with the interval tree. Further, in some embodiments, when the snapping guide decluttering system 102 determines an overlap of the current object bounds with the interval tree, the snapping guide decluttering system 102 segregates the obscuring objects from the obscured objects. For instance, the snapping guide decluttering system 102 segregates the obscuring objects from the obscured objects based on performing an act 518 of comparing the z-order value of the current object and the intersecting object (e.g., by utilizing the z-order map such as z-order map 304 discussed above). Accordingly, if the current object has a higher z-order value than the intersecting object, then the current object is an obscuring object, if not, then the current object is the obscured object.

Further, after comparing the z-order value to determine obscured objects and obscuring objects, the snapping guide decluttering system 102 further performs an act 520 of determining a transparency value of the obscuring object. For example, a transparency value includes the opacity or see-through quality of an object or element in a digital illustration document. For instance, in some embodiments a higher transparency value indicates a higher numerical or percentage representation of the transparency (e.g., see-thorough) of an object or element within a digital illustration document. Further, in some embodiments a lower transparency value indicates that the object is less transparent (e.g., 0% indicates fully opaque). In some embodiments, the snapping guide decluttering system 102 utilizes an opaqueness value where a higher opaqueness value indicates less transparency, and a lower opaqueness value indicates more transparency.

In one or more embodiments, if the obscuring object has no fill or a fill that indicates transparency, then the snapping guide decluttering system 102 populates the data map 512 with the current top object bounds and the current bottom object bounds. For instance, because the obscuring object has transparency properties, the snapping guide decluttering system 102 determines to not exclude a snapping guide that snaps to a region obscured by the transparent object.

In some instances, the snapping guide decluttering system 102 populates the data map 512 with the transparency value. On the other hand, in some embodiments, the snapping guide decluttering system 102 determines the current object has a fill and the fill indicates zero transparency. In some such embodiments, the snapping guide decluttering system 102 populates the data map 512 with the dormancy-status (e.g., how much of another object is the current object obscuring). Accordingly, for obscuring objects with a transparency value that indicates non-opaqueness, the snapping guide decluttering system 102 provides a snapping guide that snaps to that region because the snapping guide would be visible due to the transparent property of the obscuring object.

In one or more embodiments, for the x-point of the x-point list that represents the left edge, the snapping guide decluttering system 102 inserts the bottom object bounds and the top object bounds into the interval tree. In one or more embodiments, if the x-point in the x-point list represents a right edge, the snapping guide decluttering system 102 removes the current bottom object bounds and the current top object bounds from the interval tree. In particular, the snapping guide decluttering system 102 includes the y-coordinate values the correspond with the left edge and removes the x-point that represents a right edge after processing all intersections of the object with other surrounding objects.

As shown in FIG. 5B, in some embodiments the snapping guide decluttering system 102 performs an act 522 of determining no overlapping values with the interval tree. In some such embodiments, the snapping guide decluttering system 102 performs an act 524 of removing the object from the data map 512. In other words, when an object does not act as an obscuring or an obscured object, the snapping guide decluttering system 102 does not need to utilize that object in a snapping evaluation process.

Furthermore, although FIG. 5B shows the snapping guide decluttering system 102 performing acts for a single object (e.g., identifying a left edge x-coordinate for an object, etc.), in one or more embodiments the snapping guide decluttering system 102 iterates through the acts shown in FIG. 5B for each object within the data map 512. In such a manner, the snapping guide decluttering system 102 determines the relevant objects (e.g., obscuring, and obscured objects) within the data map 512 for further snapping evaluations.

Moreover, although FIG. 5B describes specific steps for generating the data map and determining at least partially obscured objects, in some embodiments the snapping guide decluttering system 102 modifies the number of steps, the order of the steps, and/or the steps themselves. In one or more embodiments, the snapping guide decluttering system 102 utilizes the object overlap model to reference the data map 512 to perform an act of identifying a leftmost x-coordinate value for an object. Furthermore, as shown, the snapping guide decluttering system 102 performs an act of iterating from a leftmost x-coordinate value to a right most x-coordinate value. Moreover, as shown, from starting at the leftmost-coordinate value for an object, the snapping guide decluttering system 102 further performs an act of identifying an overlapping x-coordinate value from another object during iterating from the leftmost x-coordinate value to the rightmost x-coordinate value.

In one or more embodiments, if the snapping guide decluttering system 102 performs the act of identifying an overlapping x-coordinate value, the snapping guide decluttering system 102 further performs an act of identifying an overlapping y-coordinate value of the object and the another object. Moreover, as shown, if the snapping guide decluttering system 102 identifies an overlapping y-coordinate value, the snapping guide decluttering system 102 further performs an act of comparing the z-order value of the object with the another object (e.g., by referencing the z-order map).

As mentioned above, the snapping guide decluttering system 102 determines a set of snapping guides to provide for display for a user interaction. For example, as shown in FIG. 6, the snapping guide decluttering system 102 determines for a user interaction one or more snapping guides to provide and/or to exclude one or more snapping guides based on at least partially obscured objects in accordance with one or more embodiments.

Figure 6:
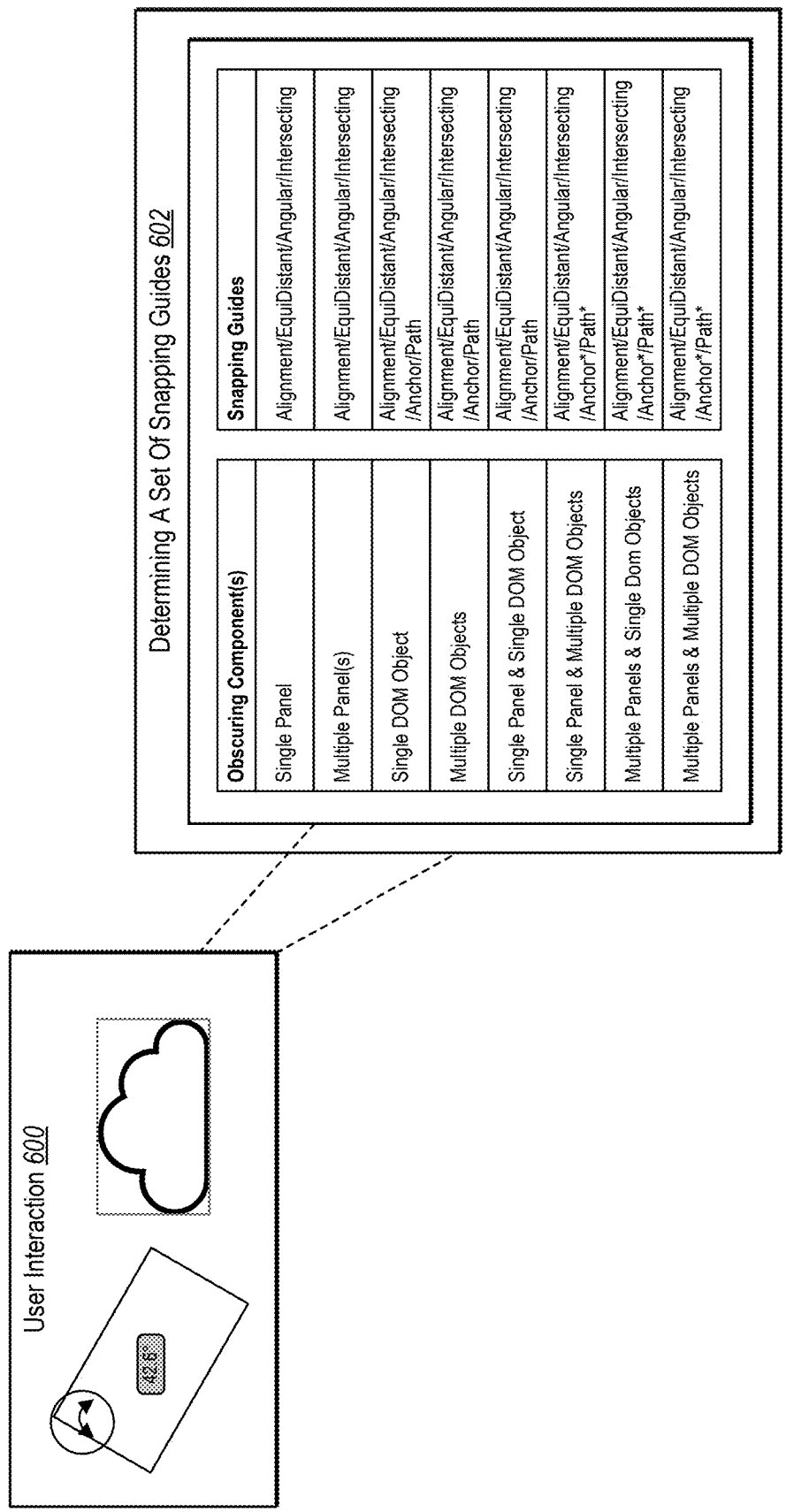
FIG. 6 illustrates a diagram of the snapping guide decluttering system determining a set of snapping guides for a user interaction in accordance with one or more embodiments.

For example, as shown in FIG. 6, the snapping guide decluttering system 102 receives an indication of a user interaction 600. In some embodiments, the user interaction 600 includes a user of a client device interacting with an object within a digital illustration document. For instance, the user interaction 600 includes a translation action, a scaling action, and a rotation action. Further, a translation action includes moving an object from a first position within the digital illustration document to a second position in the digital illustration document. Moreover, a scaling action includes increasing or decreasing the size of an object within the digital illustration document. Further, a rotation action includes an adjustment to the orientation of an object by adjusting an angle.

As shown in FIG. 6, the snapping guide decluttering system 102 performs an act 602 of determining a set of snapping guides. For instance, FIG. 6 shows obscuring components and snapping guides available for a target object (e.g., an object where a snapping guide snaps to). Further, FIG. 6 shows the available snapping guides for the target object completely or partially in the viewport and either totally or partially obscured by the obscuring component.

To illustrate, as shown in FIG. 6, for a single panel as the obscuring component, the snapping guide decluttering system 102 determines snapping guides of alignment (e.g., a line or label when an object is centered with respect to a target object, aligned with a canvas edge, or evenly spaced), equidistant (e.g., a guide to maintain consistent spacing between multiple objects or elements on a canvas), angular (e.g., a guide to align objects along certain angles or to achieve a specific orientation), and intersecting (e.g., a guide to align and position objects or elements to intersect or meet at specific points, lines, or shapes).

Moreover, for each of the obscuring components shown in FIG. 6, the available snapping guides for the target object also include snapping guides for the target object completely or partially in the viewport and either totally or partially obscured by the obscuring component. Furthermore, for the single panel and multiple DOM objects obscuring components, the multiple panels and single DOM objects, and multiple panels and multiple DOM objects, FIG. 6 shows an asterisk next to the path snapping guide. For instance, the asterisk represents if the snapping for the target object is a DOM object.

In one or more embodiments, the snapping guide decluttering system 102 utilizes the object overlap model and the data map discussed in FIGS. 4, 5A, and 5B and the available snapping guides shown in FIG. 6, to determine which snapping guides to provide and which snapping guides to exclude. For instance, as soon as the snapping guide decluttering system 102 receives the user interaction 600, the snapping guide decluttering system 102 performs a snapping evaluation. To illustrate, for the snapping evaluation, the snapping guide decluttering system 102 traverses the object tree (e.g., discussed above in FIG. 4) and discards objects completely outside of the viewport (e.g., excludes snapping guides for target objects wholly outside of the viewport).

Furthermore, in some embodiments, the snapping guide decluttering system 102 identifies objects partially inside the viewport based on the user interaction 600 (e.g., identifies a user's cursor position or an object's bounds or angular position). Moreover, in some such embodiments, the snapping guide decluttering system 102 identifies objects from the data map (e.g., discussed above in FIGS. 5A-5B), if the target objects are also found in the data map, then the snapping guide decluttering system 102 determines whether the objects are fully or partially dormant (e.g., a region partially obscured or obscuring). In some such embodiments, the snapping guide decluttering system 102 skips over fully dormant target objects (e.g., wholly obscured), which excludes (e.g., suppresses) the snapping guide from showing in the graphical user interface.

Furthermore, in some such embodiments, the snapping guide decluttering system 102 performs an evaluation for partially dormant target objects (e.g., partially obscured objects). For instance, the snapping guide decluttering system 102 utilizes the data map to determine if the data map corresponds to an obscured region of the target object, such regions are skipped from the snapping evaluation, which further excludes snapping guides (e.g., ghost guides) from showing in the graphical user interface. In other words, the snapping guide decluttering system 102 only performs a snapping evaluation (e.g., determines which snapping guides to display in a graphical user interface) if a region to snap over in the target object is not wholly obscured or partially obscured.

Although FIG. 6 shows the snapping guide decluttering system 102 determining a set of snapping guides for a specific viewport, in one or more embodiments, the snapping guide decluttering system 102 performs some of the processes and acts described above in FIGS. 3-6 in response to an update or change to the viewport. For instance, the snapping guide decluttering system 102 does not have to re-generate the object tree (e.g., the object tree 402), rather the snapping guide decluttering system 102 updates the data map for changes to the x-coordinate values, the y-coordinate values, and the transparency values. Moreover, in some embodiments, the snapping guide decluttering system 102 updates the data map in response to a change in the z-order (e.g., from the layers panel).

Figure 7A:
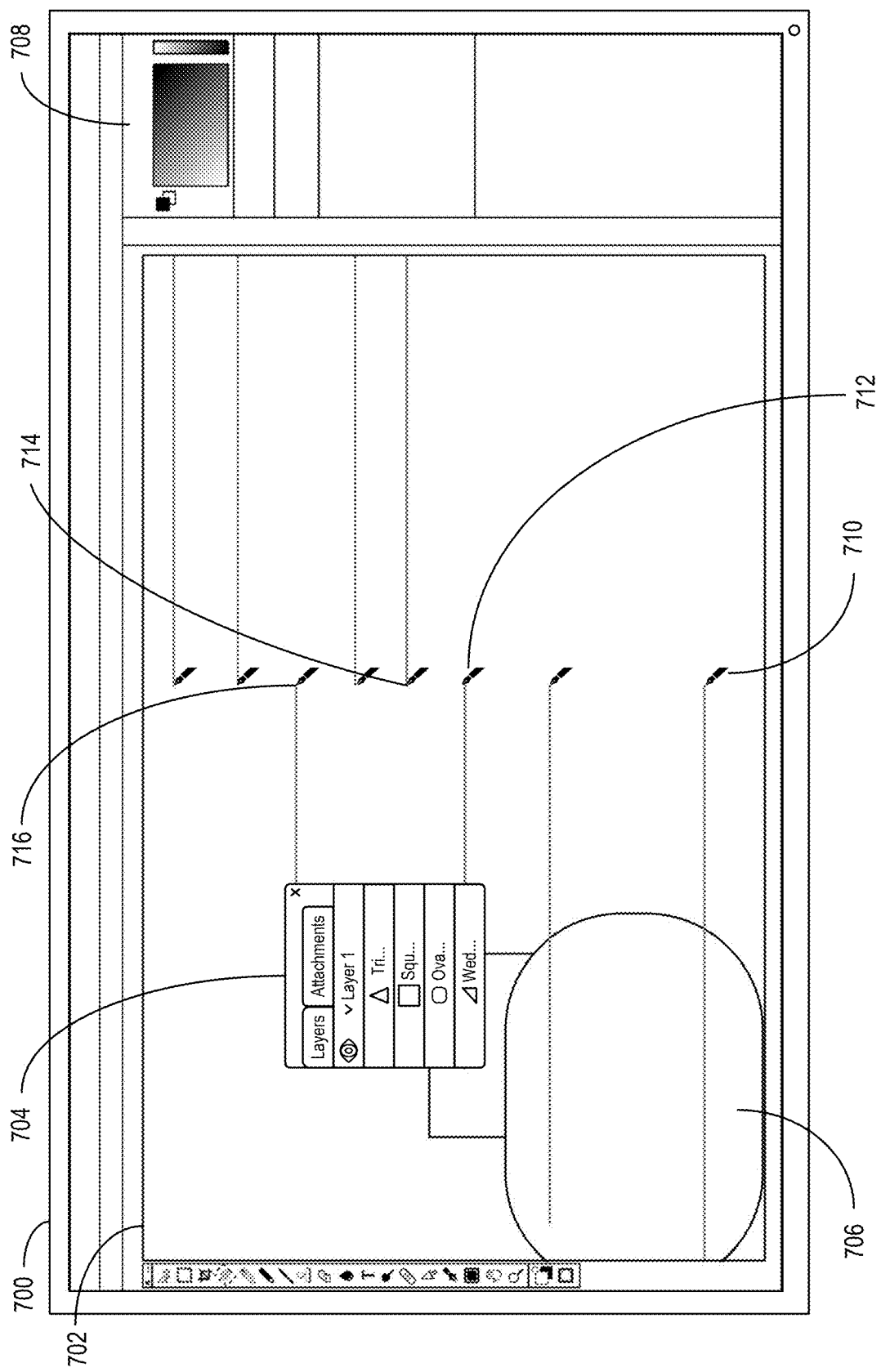
FIGS. 7A-7C illustrates a comparison for user interface panels obscuring objects in a viewport of prior systems versus user interface panels obscuring objects in the snapping guide decluttering system in accordance with one or more embodiments.

FIG. 7A illustrates prior systems suffering from a plurality of ghost guides and dangling guides in accordance with one or more embodiments. For example, FIG. 7A shows non-DOM objects acting as obscuring objects within a graphical user interface. For instance, FIG. 7A shows a viewport 702 of a digital illustration application 700 and various entities within the viewport 702. Further, FIG. 7A shows a first non-DOM object 704, a DOM object 706, a second non-DOM object 708, and snapping guides 710-716. As shown in FIG. 7A, the snapping guide 710 snaps to an object outside of the viewport 702, the snapping guide 712 snaps to an object behind the first non-DOM object 704, the snapping guide 714 snaps to an object behind the second non-DOM object 708, and the snapping guide 716 also snaps to an object behind the first non-DOM object 704.

Figure 7B:
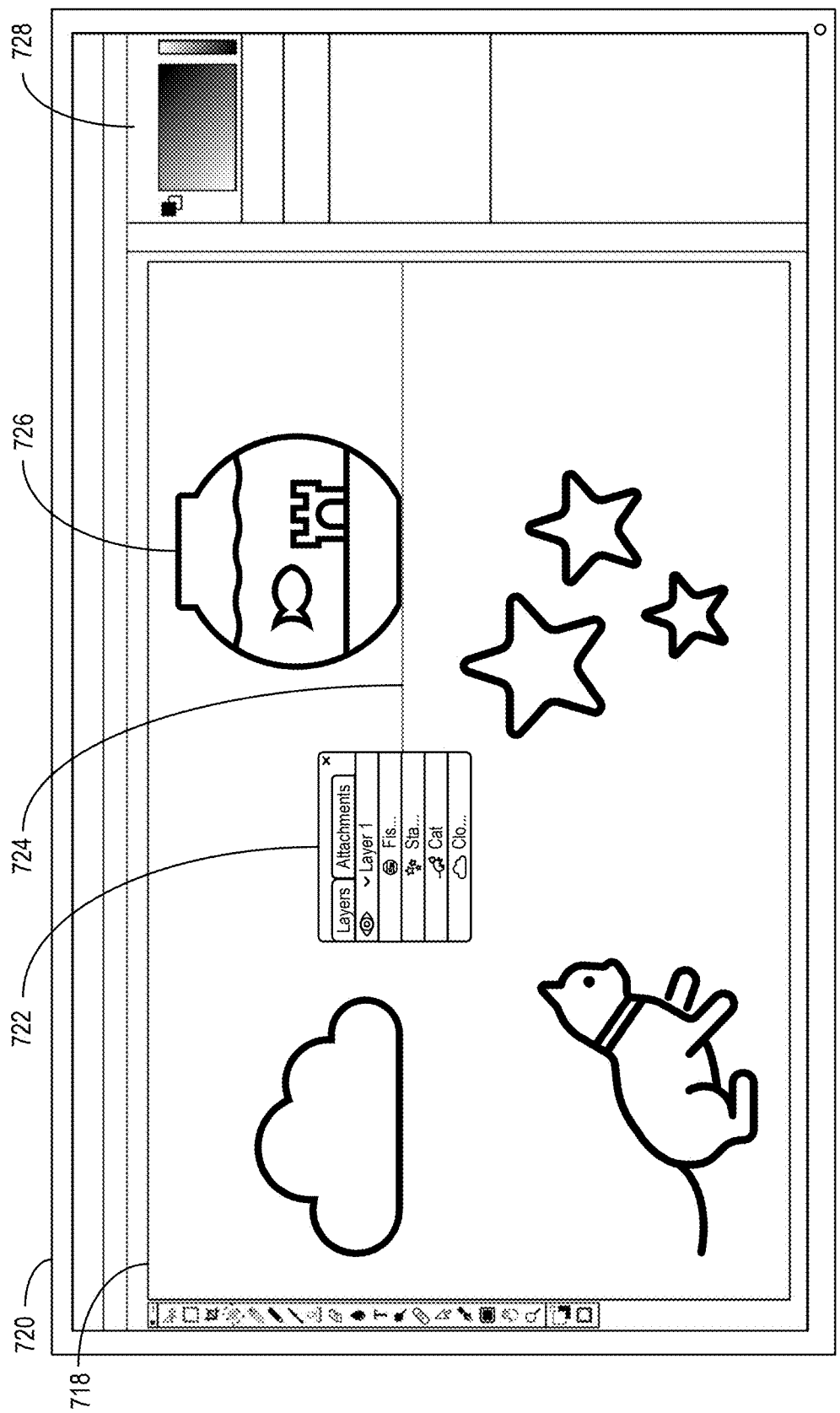

FIG. 7B illustrates prior systems suffering from ghost guides in response to a user interaction to modify an object in accordance with one or more embodiments. For example, FIG. 7B shows a digital illustration application 720 and a viewport 718. For instance, the viewport 718 shows a first non-DOM object 722 and a second non-DOM object 728. Further, FIG. 7B shows a user interaction for a DOM object 726 and a snapping guide 724. As shown, the snapping guide 724 snaps to an object(s) not shown within the viewport 718 (e.g., the object(s) are obstructed by the non-DOM objects 722 and 728).

Figure 7C:
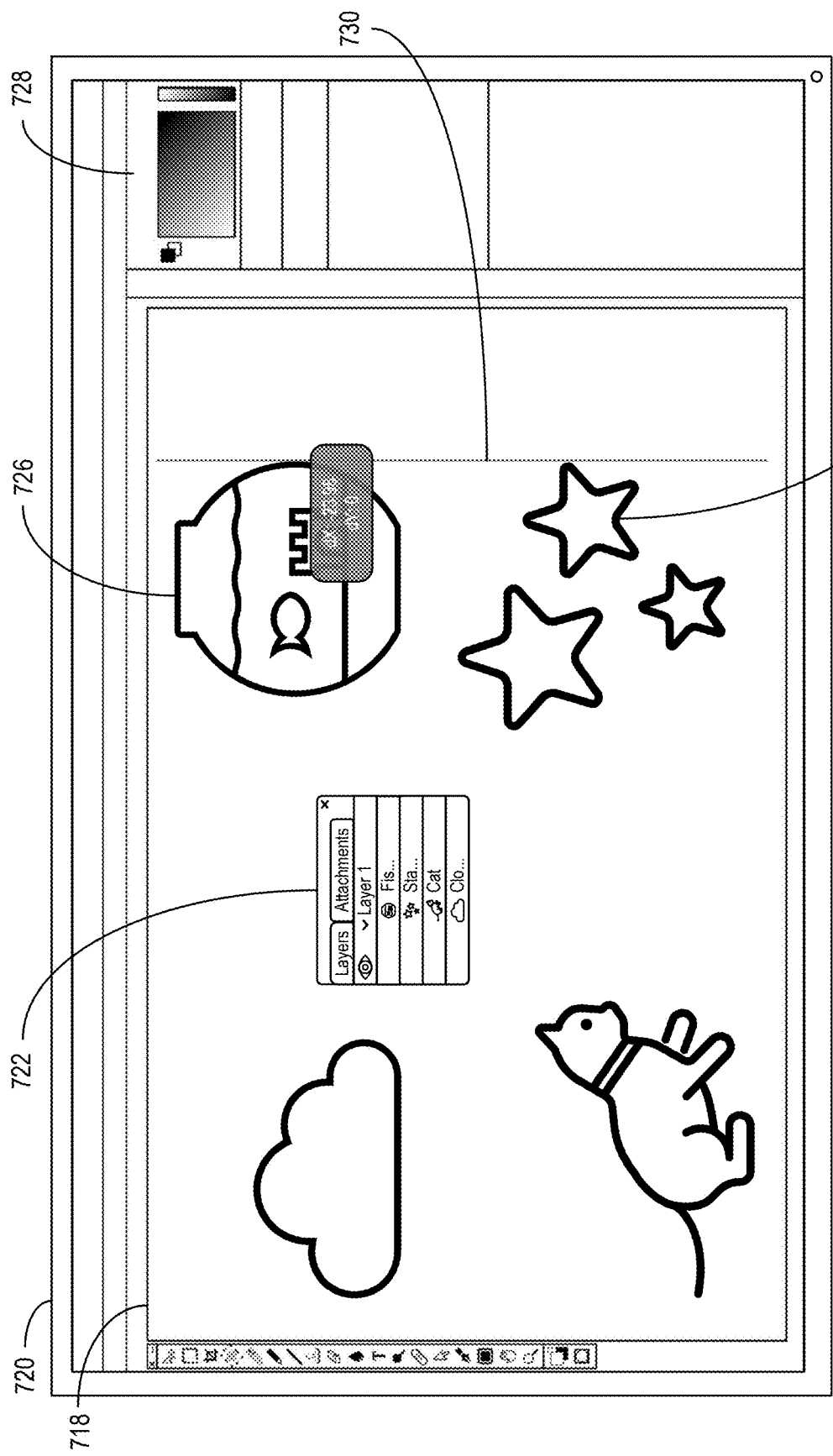

FIG. 7C illustrates the snapping guide decluttering system 102 improving the viewport of the digital illustration application in accordance with one or more embodiments. For example, FIG. 7C shows the snapping guide decluttering system 102 excluding the snapping guide 724 shown in FIG. 7B. Specifically, the snapping guide decluttering system 102 utilizes the data map (discussed above) to identify objects wholly or partially obscured by the first non-DOM object 722 and the second non-DOM object 728. Based on determining that a target object that the DOM object 726 would typically provide a snapping guide that snaps to a wholly or partially obscured target object, the snapping guide decluttering system 102 excludes that snapping guides (e.g., the snapping guide decluttering system 102 suppresses the snapping guide 724). As shown in FIG. 7C, the snapping guide decluttering system 102 however shows a snapping guide 730 for an additional DOM object 732 (e.g., because the additional DOM object 732 is not partially or wholly obscured).

Figure 8A:
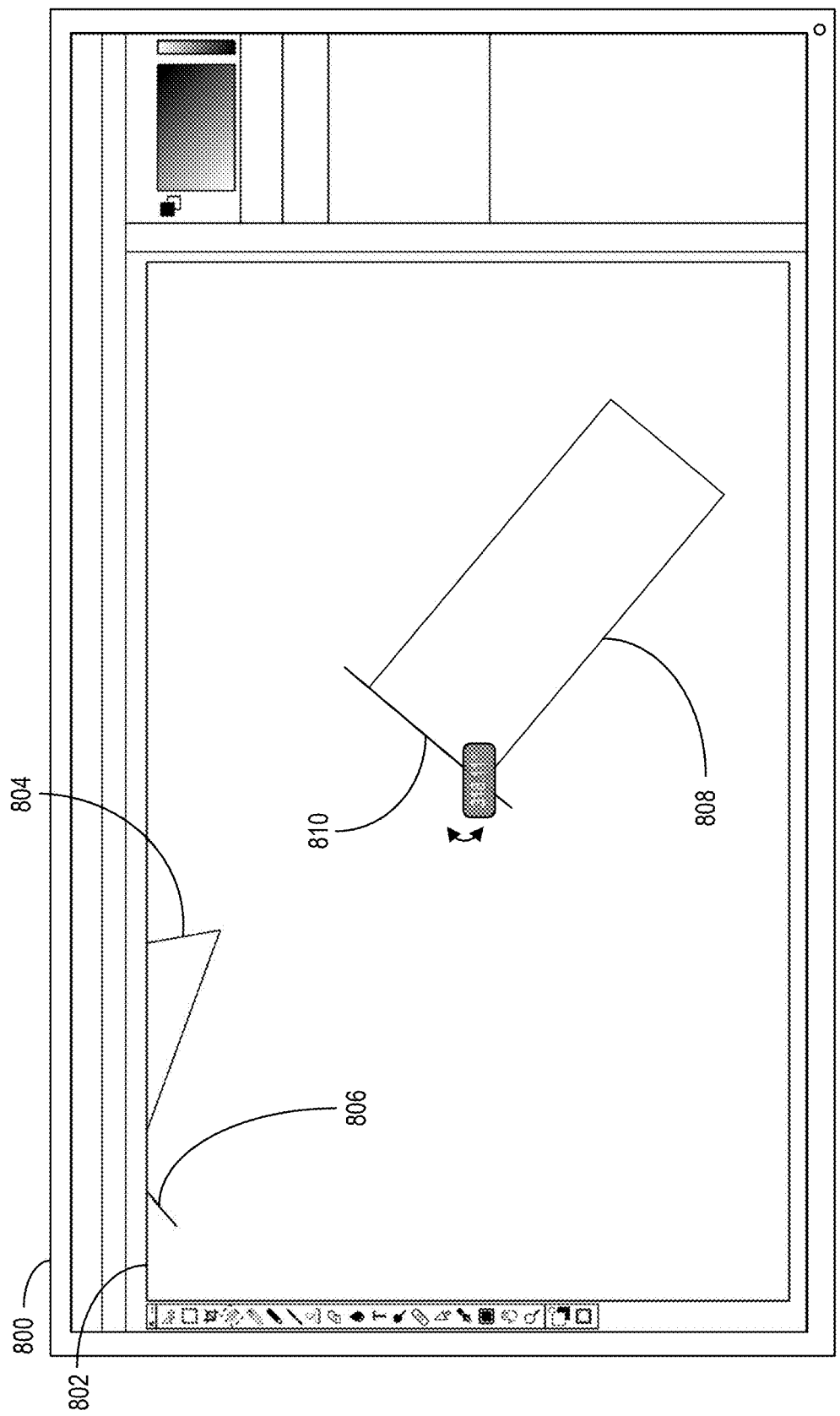
FIGS. 8A-8C illustrates a comparison for objects obscuring other objects in a viewport of prior systems versus objects obscuring other objects in a viewport of the snapping guide decluttering system in accordance with one or more embodiments.

FIG. 8A shows prior systems displaying a snapping guide for a region of an object not fully within the viewport in accordance with one or more embodiments. For example, FIG. 8A shows for a digital illustration application 800 a viewport 802 where a first DOM object 804 is partially within the viewport 802 and partially outside of the viewport 802. Furthermore, FIG. 8A shows the prior system receiving a user interaction for a second DOM object 808 and displaying a first snapping guide 810 that corresponds to a second snapping guide 806. Specifically, FIG. 8A illustrates issues with the first snapping guide 810 snapping to a region of the first DOM object 804 not within the viewport 802. As illustrated, such snapping guides are not useful and incomprehensible.

Figure 8B:
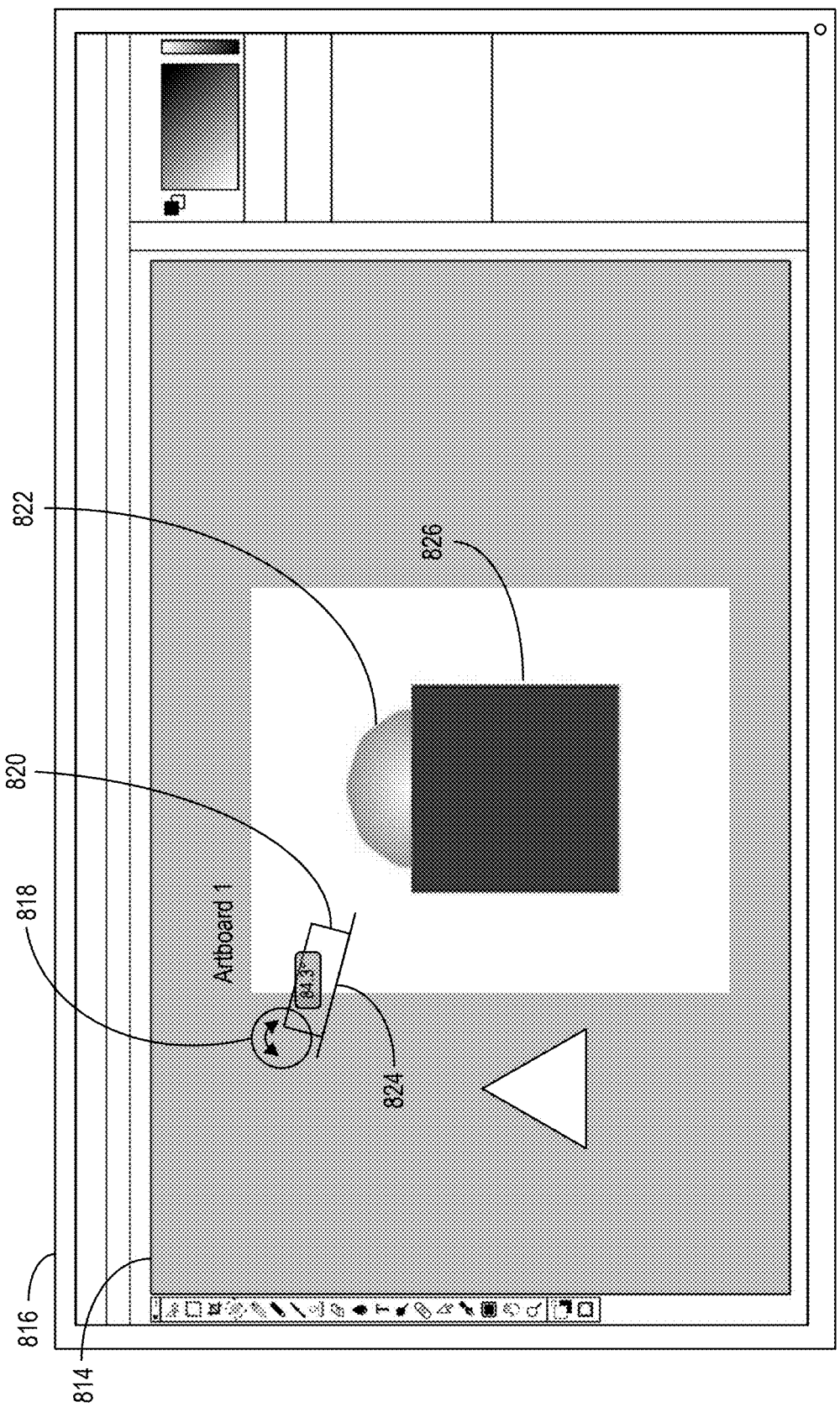

FIG. 8B also shows prior systems suffering from displaying unnecessary snapping guides. For example, FIG. 8B shows a digital illustration application 816 with a viewport 814 and a first DOM object 820. In particular, FIG. 8B shows a user interaction 818 to modify the first DOM object 820 and a snapping guide 824 that snaps to a second DOM object 822. However, the snapping guide 824 is unnecessary because it is snapping to a region of the second DOM object 822 not visible in the viewport 814. Specifically, the region of the second DOM object 822 not visible, is obstructed by a third DOM object 826.

Figure 8C:
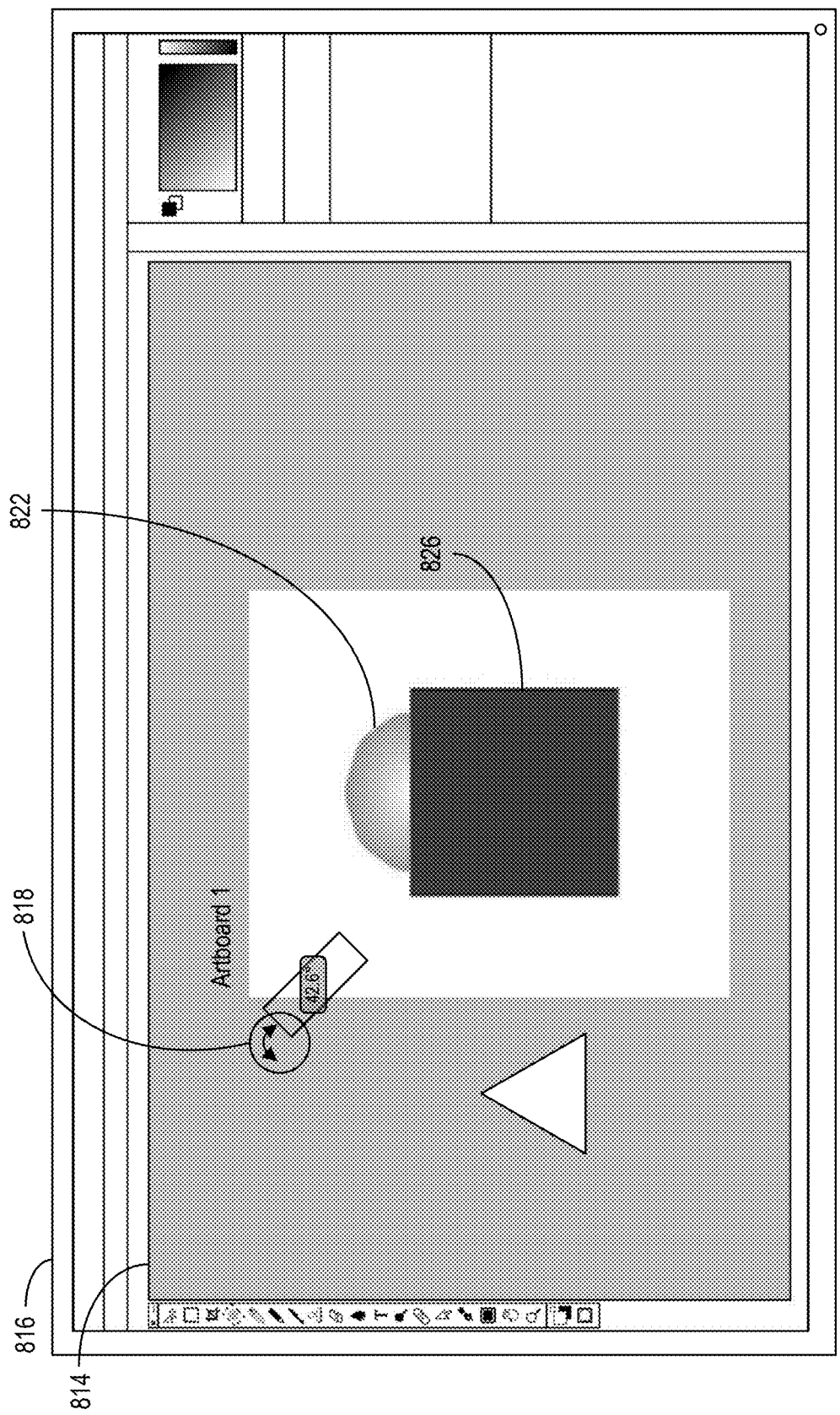

FIG. 8C shows the snapping guide decluttering system 102 improving upon prior systems by not displaying unnecessary snapping guides. In contrast to prior systems which would display a snapping guide for the second DOM object 822 (e.g., the target object), FIG. 8C shows that in response to the user interaction 818, the snapping guide decluttering system 102 does not show the snapping guide 824. Specifically, the snapping guide decluttering system 102 references the data map (discussed above) and excludes the snapping guide from displaying because it determines that the snapping guide corresponds to a region of the second DOM object 822 not visible within the viewport 814.

For instance, the snapping guide decluttering system 102 utilizes the object overlap model to identify (within the data map) that the second DOM object 822 is an obscured object and the specific portion of the second DOM object 822 obscured within the viewport (e.g., by the third DOM object 826). Moreover, in some such instances, based on the user interaction 818, the snapping guide decluttering system 102 determines whether the snapping guide corresponds to the portion of the second DOM object 822 obscured by the third DOM object 826.

Figure 9:
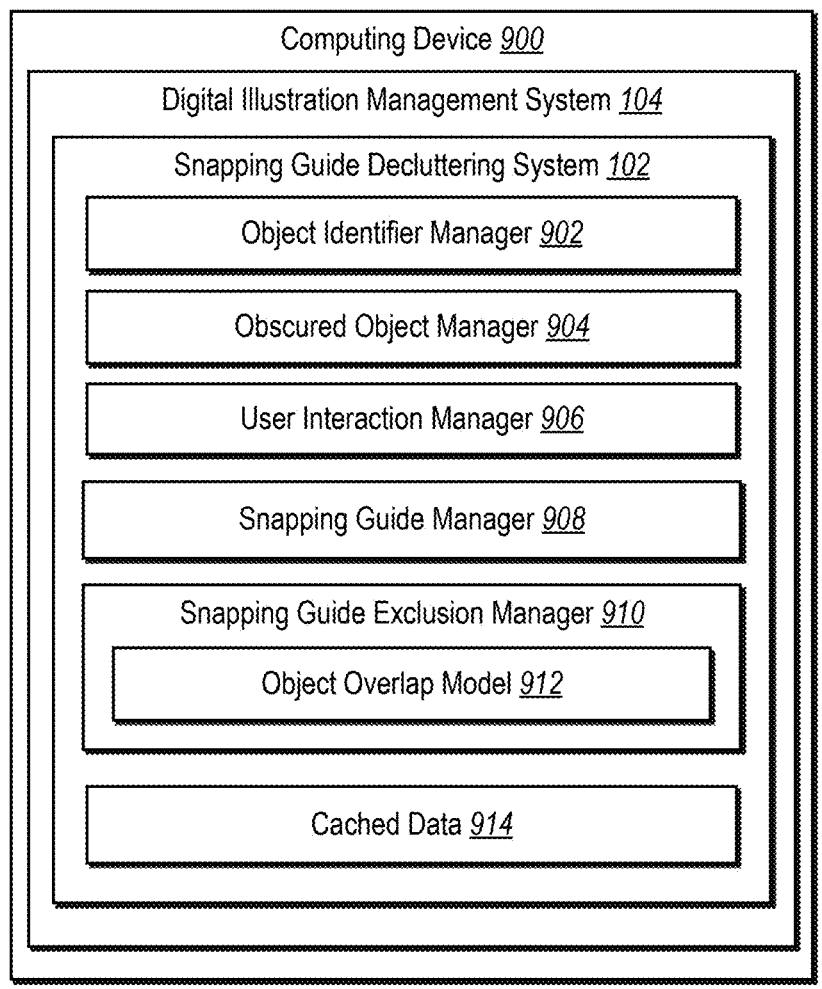
FIG. 9 illustrates a schematic diagram of the snapping guide decluttering system in accordance with one or more embodiments.

Turning to FIG. 9, additional detail will now be provided regarding various components and capabilities of the snapping guide decluttering system 102. In particular, FIG. 9 illustrates an example schematic diagram of a computing device 900 (e.g., the server(s) 106 and/or the client device 110) implementing the snapping guide decluttering system 102 in accordance with one or more embodiments of the present disclosure for components 900-914. As illustrated in FIG. 9, the snapping guide decluttering system 102 includes an object identifier manager 902, an obscured object manager 904, a user interaction manager 906, a snapping guide manager 908, a snapping guide exclusion manager 910, an object overlap model 912, and cached data 914.

The object identifier manager 902 identifies a set of objects. For example, the object identifier manager 902 identifies a set of objects within a viewport. In particular, object identifier manager 902 detects DOM objects and non-DOM objects within the viewport of a digital illustration application. Furthermore, the object identifier manager 902 also identifies objects completely outside of the viewport to use in future snapping evaluations. Moreover, the object identifier manager 902 collaborates with other components by providing the identified set of objects to the other components.

The obscured object manager 904 determines at least partially obscured objects. For example, the obscured object manager 904 determines at least partially obscured objects within the viewport of the digital illustration application from the set of identified objects. Further, in some embodiments the obscured object manager 904 determines wholly obscured objects, and partially obscured objects, specifically, the obscured object manager 904 determines a specific region of an object obscured by another object. In doing so, the obscured object manager 904 helps assists the snapping guide decluttering system 102 in performing snapping evaluations.

The user interaction manager 906 receives user interactions. For example, the user interaction manager 906 receives an interaction to modify an object within the digital illustration application. For instance, the user interaction manager 906 receives an interaction such as a rotation, scaling, or shifting, of an object. Moreover, in some embodiments, the user interaction manager 906 assists the snapping guide decluttering system 102 in evaluating user interactions and corresponding snapping guides.

The snapping guide manager 908 determines a set of snapping guides to aid in modifying an object. For example, the snapping guide manager 908 evaluates a user interaction and identifies corresponding snapping guides for a target object. Furthermore, the snapping guide manager 908 provides the determined set of snapping guides to aid in modifying the object to the snapping guide exclusion manager 910.

The snapping guide exclusion manager 910 provides a subset of the snapping guides determined by the snapping guide manager 908 and excludes some snapping guides. For example, the snapping guide exclusion manager 910 excludes snapping guides based on the one or more at least partially obscured objects. In particular, the snapping guide exclusion manager 910 utilizes the object overlap model 912 to exclude snapping guides.

The object overlap model 912 generates a data map for the objects in the viewport. Furthermore, in some embodiments the object overlap model 912 also iterates through the data map to determines partially obscured objects (e.g., regions partially obscured) and wholly obscured objects. In doing so, the object overlap model 912 assists the snapping guide decluttering system 102 during evaluation of snapping guides. Specifically, the object overlap model 912 indicates to the snapping guide exclusion manager 910 which snapping guides to exclude and which ones to include.

The cached data 914 stores the data map and other data obtained from the viewport of the digital illustration application. For example, the cached data 914 caches/stores the identified set of objects in the viewport along with information such as whether the object is partially or wholly obscured. Accordingly, the snapping guide decluttering system 102 references the cached data 914 in performing a snapping guide evaluation. Furthermore, in some embodiments, the cached data 914 updates in response to any changes to the viewport (zooming/scrolling, etc.).

Each of the components 902-914 of the snapping guide decluttering system 102 can include software, hardware, or both. For example, the components 902-914 can include one or more instructions stored on a computer-readable storage medium and executable by processors of one or more computing devices, such as a client device or server device. When executed by the one or more processors, the computer-executable instructions of the snapping guide decluttering system 102 can cause the computing device(s) to perform the methods described herein. Alternatively, the components 902-914 can include hardware, such as a special-purpose processing device to perform a certain function or group of functions. Alternatively, the components 902-914 of the snapping guide decluttering system 102 can include a combination of computer-executable instructions and hardware.

Furthermore, the components 902-914 of the snapping guide decluttering system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-914 of the snapping guide decluttering system 102 may be implemented as a stand-alone application, such as a desktop or mobile application. Furthermore, the components 902-914 of the snapping guide decluttering system 102 may be implemented as one or more web-based applications hosted on a remote server. Alternatively, or additionally, the components 902-914 of the snapping guide decluttering system 102 may be implemented in a suite of mobile device applications or "apps." For example, in one or more embodiments, the snapping guide decluttering system 102 can comprise or operate in connection with digital software applications such as ADOBE® CREATIVE CLOUD EXPRESS, ADOBE® PHOTOSHOP, ADOBE® ILLUSTRATOR, ADOBE® PREMIERE, ADOBE® INDESIGN, and/or ADOBE® EXPERIENCE CLOUD. "ADOBE," "PHOTOSHOP," "INDESIGN," and "ILLUSTRATOR". The foregoing are either registered trademarks or trademarks of Adobe Inc. in the United States and/or other countries.

Figure 10:
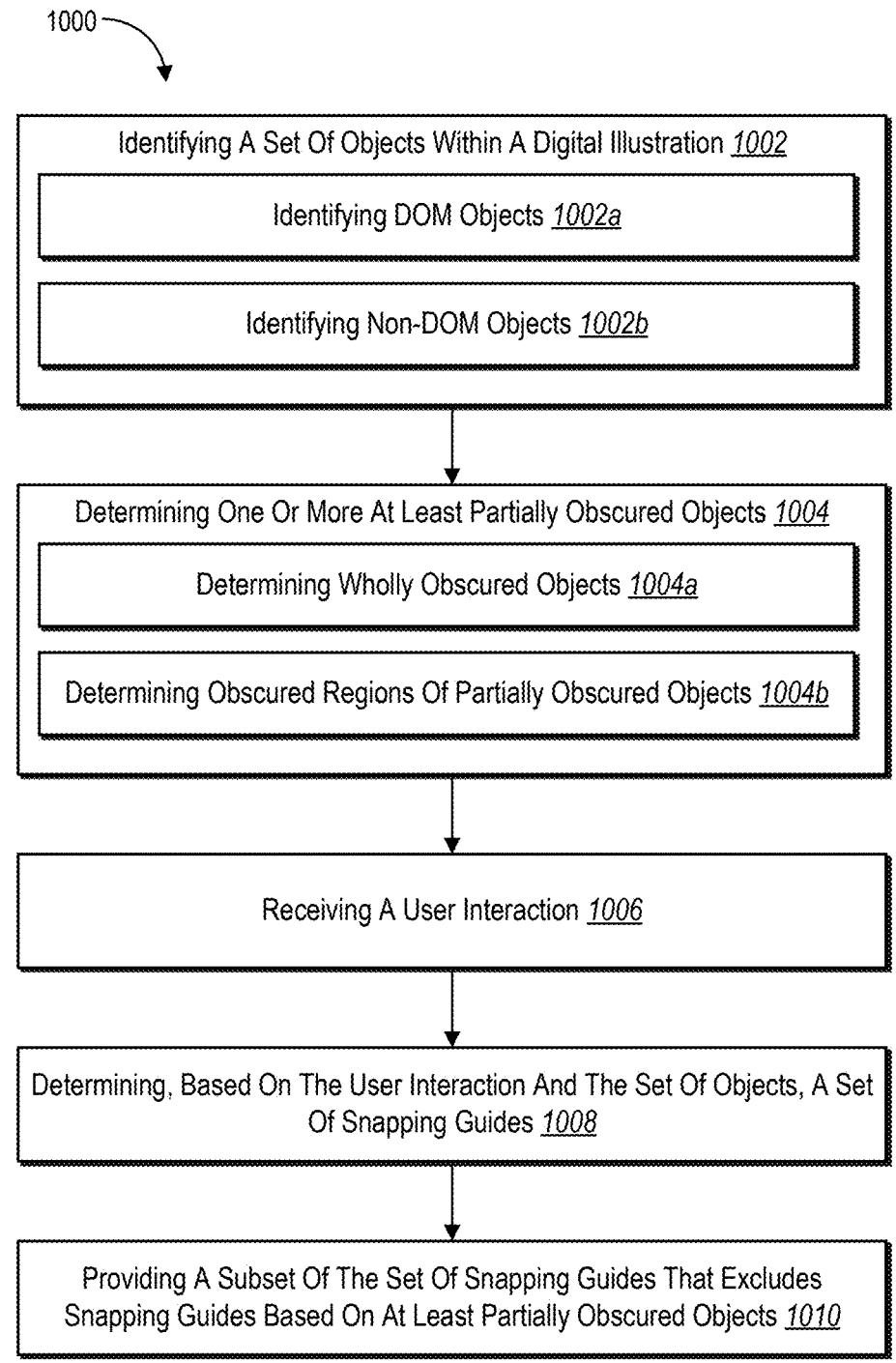
FIG. 10 illustrates a flowchart of a series of acts for providing a subset of the snapping guides that excludes snapping guides based on one or more at least partially obscured objects in accordance with one or more embodiments.

FIGS. 1-9, the corresponding text, and the examples provide a number of different methods, systems, devices, and non-transitory computer-readable media of the snapping guide decluttering system 102. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for providing a subset of the set of snapping guides and excluding snapping guides in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed as part of a computer-implemented method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device. The system further includes at least one server device configured to cause the system to perform the acts of FIG. 10.

The series of acts 1000 includes an act 1002 of identifying a set of objects within a digital illustration. Further, the series of acts 1000 includes a sub-act 1002a of identifying DOM objects and a sub-act 1002b of identifying non-DOM objects. For example, the series of acts 1000 includes an act 1004 of determining one or more at least partially obscured objects. Further, the series of acts 1000 includes a sub-act 1004a of determining wholly obscured objects and a sub-act 1004b of determining obscured regions of partially obscured objects. Moreover, the series of acts 1000 includes an act 1006 of receiving a user interaction. Additionally, the series of acts 1000 includes an act 1008 of determining, based on the user interaction and the set of objects, a set of snapping guides. Furthermore, the series of acts 1000 includes an act 1010 of providing a subset of the set of snapping guides that excludes snapping guides based on at least partially obscured objects.

In particular, the act 1002 includes identifying a set of objects within a viewport of a digital illustration application. Further, the act 1004 includes determining one or more at least partially obscured objects within the viewport of the digital illustration application. Moreover, the act 1006 includes receiving a user interaction to modify an object. Furthermore, the act 1008 includes determining, based on the user interaction and the set of objects, a set of snapping guides to aid in modifying the object. Moreover, the act 1010 includes providing, in response to the user interaction, a subset of the set of snapping guides that excludes snapping guides based on the one or more at least partially obscured objects.

For example, in one or more embodiments, the series of acts 1000 includes excluding snapping guides for wholly obscured objects and snapping guides for obscured regions of partially obscured objects. In addition, in one or more embodiments, the series of acts 1000 includes detecting, within the viewport of the digital illustration application, non-document object model objects. Further, in one or more embodiments, the series of acts 1000 includes detecting, partially and wholly within the viewport of the digital illustration application, document object model objects.

Moreover, in one or more embodiments, the series of acts 1000 includes determining obscured object regions of document object model objects. Further, in one or more embodiments, the series of acts 1000 includes generating, from the set of objects within the viewport, a z-order map, wherein the z-order map indicates a z-axis value of an object of the set of objects. Moreover, in one or more embodiments, the series of acts 1000 includes assigning non-document object model objects within the viewport, a first z-order value greater than z-order values assigned to document object model objects. Further, in one or more embodiments, the series of acts 1000 includes determining, from the z-order map, the one or more at least partially obscured objects by comparing z-order values of the set of objects.

Additionally, in one or more embodiments, the series of acts 1000 includes identifying an additional set of objects not within the viewport of the digital illustration application. Moreover, in one or more embodiments, the series of acts 1000 includes providing, in response to the user interaction, the subset of the set of snapping guides that excludes snapping guides based on the additional set of objects not within the viewport of the digital illustration application.

Furthermore, in one or more embodiments, the series of acts 1000 includes receiving the user interaction to modify the object comprises identifying an action comprising at least one of a translation, scaling, or rotation of the object. Moreover, in one or more embodiments, the series of acts 1000 includes determining the set of snapping guides to aid in modifying the object based on the action.

Moreover, in one or more embodiments, the series of acts 1000 includes for a first additional object of the set of objects, identifying a leftmost x-coordinate value. Further, in one or more embodiments, the series of acts 1000 includes from the leftmost x-coordinate value, determining a y-coordinate value that corresponds with the leftmost x-coordinate value. Moreover, in one or more embodiments, the series of acts 1000 includes determining an overlap between the y-coordinate value and a second additional object of the set of objects.

In addition, in one or more embodiments, the series of acts 1000 includes comparing a z-order value of the first additional object and the second additional object to determine an at least partially obscured object. Further, in one or more embodiments, the series of acts 1000 includes determining transparency values of obscuring objects. Moreover, in one or more embodiments, the series of acts 1000 includes providing, in response to the user interaction, the subset of the set of snapping guides that excludes a snapping guide based on a transparency value that indicates an opaque obscuring object.

Further, in one or more embodiments, the series of acts 1000 includes identifying a set of objects within a viewport of a digital illustration application. Moreover, in one or more embodiments, the series of acts 1000 includes determining obscured objects within the viewport of the digital illustration application by utilizing an object overlap model to determine partially obscured regions of objects of the set of objects, wholly obscured objects of the set of objects, and obscuring objects of the set of objects. Further, in one or more embodiments, the series of acts 1000 includes receiving a user interaction to modify an object. Moreover, in one or more embodiments, the series of acts 1000 includes determining, based on the user interaction and the set of objects, a set of snapping guides to aid in modifying the object. Further, in one or more embodiments, the series of acts 1000 includes providing, in response to the user interaction, a subset of the set of snapping guides that excludes snapping guides based on the partially obscured regions of objects and the wholly obscured objects.

Further, in one or more embodiments, the series of acts 1000 includes detecting, within the viewport of the digital illustration application, non-document object model objects comprising user interface panels. Moreover, in one or more embodiments, the series of acts 1000 includes detecting, partially and wholly within the viewport of the digital illustration application, document object model objects.

Moreover, in one or more embodiments, the series of acts 1000 includes generating a data map for the viewport that comprises partially obscured regions of objects of the set of objects and wholly obscured objects of the set of objects. Furthermore, in one or more embodiments, the series of acts 1000 includes receive the user interaction to modify the object comprises identifying an action comprising at least one of a translation, scaling, or rotation of the object. Additionally, in one or more embodiments, the series of acts 1000 includes in response to the user interaction, determine to exclude one or more snapping guides by referencing the data map for the viewport.

Further, in one or more embodiments, the series of acts 1000 includes determine transparency values of the obscuring objects of the set of objects. Moreover, in one or more embodiments, the series of acts 1000 includes providing, in response to the user interaction, a snapping guide of the subset of the set of snapping guides based on a transparency value that indicates a non-opaque obscuring object.

Further, in one or more embodiments, the series of acts 1000 includes identifying a set of objects within a viewport of a digital illustration application to generate a z-order map of the set of objects. Moreover, in one or more embodiments, the series of acts 1000 includes determining one or more at least partially obscured objects within the viewport of the digital illustration application based on an object overlap model and the z-order map of the set of objects. Further, in one or more embodiments, the series of acts 1000 includes receiving a user interaction to modify an object. Moreover, in one or more embodiments, the series of acts 1000 includes determining, based on the user interaction and the set of objects, a set of snapping guides to aid in modifying the object. Further, in one or more embodiments, the series of acts 1000 includes providing, in response to the user interaction, a subset of the set of snapping guides that excludes snapping guides based on the one or more at least partially obscured objects.

Further, in one or more embodiments, the series of acts 1000 includes detecting, within the viewport of the digital illustration application, non-document object model objects comprising user interface panels. Moreover, in one or more embodiments, the series of acts 1000 includes assigning the non-document object model objects a first z-order value, greater than z-order values assigned to document object model objects.

Further, in one or more embodiments, the series of acts 1000 includes receiving a document object model objects tree of the digital illustration application. Moreover, in one or more embodiments, the series of acts 1000 includes iterating through the document object model objects tree to identify objects wholly within the viewport and partially within the viewport.

Further, in one or more embodiments, the series of acts 1000 includes for the objects wholly and partially within the viewport, identifying overlapping objects based on overlapping x-coordinate values of objects within the viewport. Moreover, in one or more embodiments, the series of acts 1000 includes determining one or more at least partially obscured objects within the viewport by comparing z-order values of the overlapping objects.

Further, in one or more embodiments, the series of acts 1000 includes detecting a change in one or more of a size or position of the viewport of the digital illustration application. Moreover, in one or more embodiments, the series of acts 1000 includes re-determining the one or more at least partially obscured objects within an updated viewport based on the change in one or more of the size or the position of the viewport. Further, in one or more embodiments, the series of acts 1000 includes providing an updated subset of the set of snapping guides that excludes snapping guides based on the re-determined one or more at least partially obscured objects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
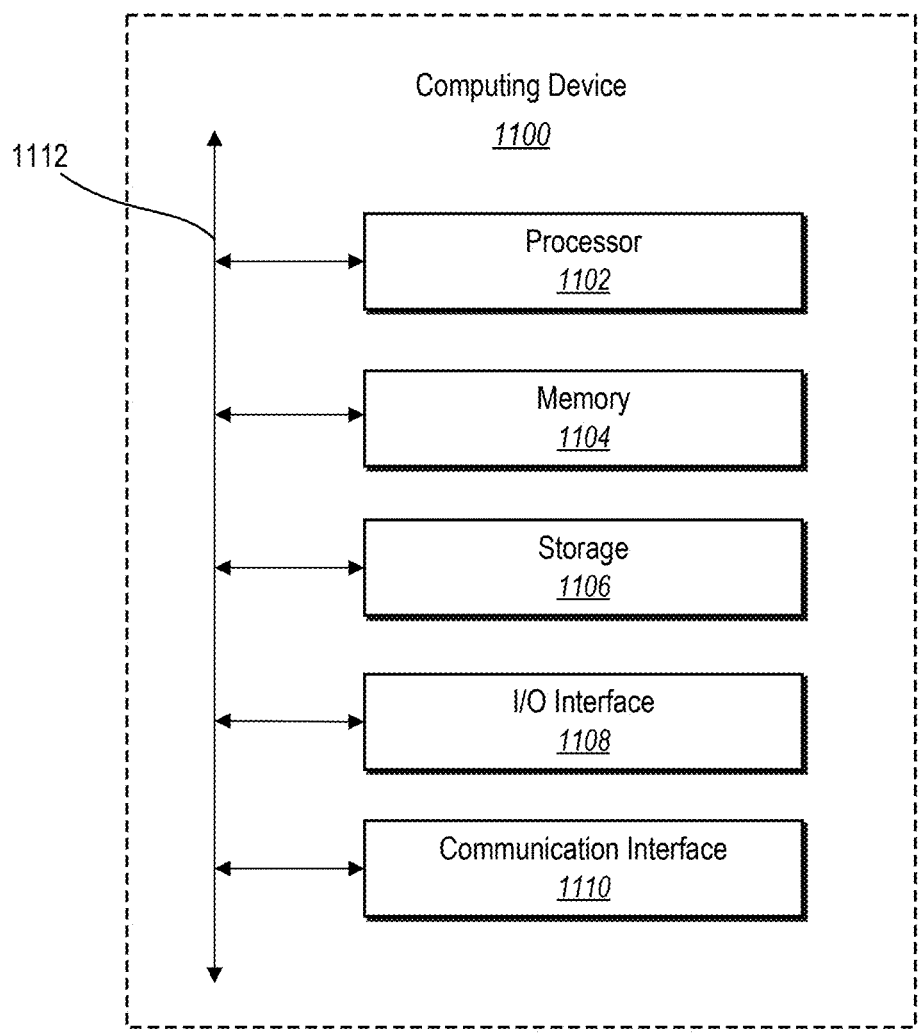
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 106 and/or the client device 110). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed:

1. A computer-implemented method comprising:
   identifying a set of objects within a viewport of a digital illustration application comprising a digital illustration document;
   determining one or more at least partially obscured objects that are digital design elements within the viewport of the digital illustration application that make up the digital illustration document, wherein the one or more at least partially obscured objects are obscured by one or more user interface panels that are visible within the digital illustration application;
   receiving a user interaction to modify an object;
   determining, based on the user interaction and the set of objects, a set of snapping guides to aid in modifying the object; and
   providing, in response to the user interaction, a subset of the set of snapping guides that excludes snapping guides based on the one or more at least partially obscured objects.

2. The computer-implemented method of claim 1, wherein providing the subset of the set of snapping guides that excludes snapping guides further comprises excluding snapping guides for wholly obscured objects and snapping guides for obscured regions of partially obscured objects.

3. The computer-implemented method of claim 1, wherein identifying the set of objects further comprises:
   detecting, within the viewport of the digital illustration application, non-document object model objects comprising the one or more user interface panels,
   wherein the one or more user interface panels provided within the digital illustration application comprises user interface tools to modify the digital design elements within the digital illustration document.

4. The computer-implemented method of claim 1, wherein determining the one or more at least partially obscured objects further comprises:
   determining positions of the one or more user interface panels and a transparency value of the one or more user interface panels, wherein the transparency value indicates a level of opaqueness; and
   providing the subset of the set of snapping guides that excludes snapping guides based on the positions of the one or more user interface panels and the transparency value of the one or more user interface panels.

5. The computer-implemented method of claim 1, further comprising:
   generating, from the set of objects within the viewport, a z-order map, wherein the z-order map indicates a z-axis value of an object of the set of objects;

assigning the one or more user interface panels within the viewport, a first z-order value greater than z-order values assigned to the one or more document object model objects; and determining, from the z-order map, the one or more at least partially obscured objects by comparing z-order values of the set of objects.

6. The computer-implemented method of claim 1, further comprising:
identifying an additional set of objects not within the viewport of the digital illustration application; and
providing, in response to the user interaction, the subset of the set of snapping guides that excludes snapping guides based on the additional set of objects not within the viewport of the digital illustration application.

7. The computer-implemented method of claim 1, further comprising:
determining an impact of the one or more user interface panels by utilizing an object overlap model comprising a sweep line algorithm and an interval tree by:
generating an objects wholly in viewport list from the set of objects within the viewport;
generating an objects partially in viewport list from the set of objects within the viewport; and
generating a combined list from the objects wholly in viewport list and the objects partially in viewport list.

8. The computer-implemented method of claim 7, further comprising:
generating an x-point list comprising x-values, object references, and object edge identifiers for the set of objects within the viewport;
arranging the x-point list according to ascender order based on x-value in the x-point list;
generating the interval tree comprising y-axis for objects of the set of objects within the viewport; and
for a first additional object of the set of objects, identifying a leftmost x-coordinate value by referencing the object edge identifiers in the x-point list.

9. The computer-implemented method of claim 8, further comprising:
from the leftmost x-coordinate value, determining a y-coordinate value in the interval tree that corresponds with the leftmost x-coordinate value;
determining an overlap between the y-coordinate value in the interval tree and a second additional object of the set of objects; and
comparing a z-order value of the first additional object and the second additional object to determine an at least partially obscured object.

10. The computer-implemented method of claim 1, wherein determining the one or more at least partially obscured objects within the viewport further comprises:
determining transparency values of obscuring objects;
storing the transparency values of the obscuring objects in a target dormancy data map; and
providing, in response to the user interaction, the subset of the set of snapping guides that excludes a snapping guide based on a transparency value that indicates an opaque obscuring object by referencing the transparency values in the target dormancy data map.

11. A system comprising:
one or more memory devices comprising objects that further comprise non-document object model objects and document object model objects; and
one or more processors configured to cause the system to:

identify a set of objects within a viewport of a digital illustration application comprising a digital illustration document;
determine obscured objects that are digital design elements within the viewport of the digital illustration application that make up the digital illustration document by utilizing an object overlap model to determine partially obscured regions of objects of the set of objects, wholly obscured objects of the set of objects, and obscuring objects of the set of objects, wherein the obscuring objects are one or more user interface panels that are visible within the digital illustration application;
receive a user interaction to modify an object;
determine, based on the user interaction and the set of objects, a set of snapping guides to aid in modifying the object; and
provide, in response to the user interaction, a subset of the set of snapping guides that excludes snapping guides based on the partially obscured regions of objects and the wholly obscured objects.

12. The system of claim 11, wherein the one or more processors are configured to cause the system to identify the set of objects within the viewport by:
detecting, within the viewport of the digital illustration application, non-document object model objects comprising the one or more user interface panels; and
detecting, partially and wholly within the viewport of the digital illustration application, document object model objects.

13. The system of claim 12, wherein the one or more processors are configured to cause the system to assign the one or more user interface panels a first z-order value, greater than z-order values assigned to one or more document object model objects.

14. The system of claim 11, wherein the one or more processors are configured to cause the system to:
generate a data map for the viewport that comprises partially obscured regions of objects of the set of objects and wholly obscured objects of the set of objects;
receive the user interaction to modify the object comprises identifying an action comprising at least one of a translation, scaling, or rotation of the object; and
in response to the user interaction, determine to exclude one or more snapping guides by referencing the data map for the viewport.

15. The system of claim 11, wherein the one or more processors are configured to cause the system to:
determine transparency values of the obscuring objects of the set of objects; and
provide, in response to the user interaction, a snapping guide of the subset of the set of snapping guides based on a transparency value that indicates a non-opaque obscuring object.

16. A non-transitory computer-readable medium storing executable instructions which, when executed by at least one processing device, cause the at least one processing device to perform operations comprising:
identifying a set of objects within a viewport of a digital illustration application to generate a z-order map of the set of objects comprising a digital illustration document;
determining one or more at least partially obscured objects that are digital design elements within the viewport of the digital illustration application that make up the digital illustration document and are based on an object overlap model and the z-order map of the set of objects, wherein the one or more at least partially obscured objects are obscured by one or more user interface panels;

receiving a user interaction to modify an object;

determining, based on the user interaction and the set of objects, a set of snapping guides to aid in modifying the object; and providing, in response to the user interaction, a subset of the set of snapping guides that excludes snapping guides based on the one or more at least partially obscured objects.

17. The non-transitory computer-readable medium of claim 16, wherein the operations further comprise:

detecting, within the viewport of the digital illustration application, a first user interface panel and a second user interface panel, wherein the first user interface panel is displayed within the digital illustration document, and the second user interface panel is displayed within the viewport but outside the digital illustration document; and providing the subset of the set of snapping guides that excludes snapping guides based on the first user interface panel and the second user interface panel.

18. The non-transitory computer-readable medium of claim 16, wherein determining one or more at least partially obscured objects within the viewport based on the object overlap model further comprises:

receiving a document object model objects tree of the digital illustration application; and iterating through the document object model objects tree to identify objects wholly within the viewport and partially within the viewport.

19. The non-transitory computer-readable medium of claim 18, further comprising:

for the objects wholly and partially within the viewport, identifying overlapping objects based on overlapping x-coordinate values of objects within the viewport; and determining one or more at least partially obscured objects within the viewport by comparing z-order values of the overlapping objects.

20. The non-transitory computer-readable medium of claim 16, wherein the operations further comprise:

detecting a change in one or more of a size or position of the viewport of the digital illustration application;

re-determining the one or more at least partially obscured objects within an updated viewport based on the change in one or more of the size or the position of the viewport; and providing an updated subset of the set of snapping guides that excludes snapping guides based on the re-determined one or more at least partially obscured objects.

* * * * *